US012739440B2

(12) United States Patent
Sun et al.

(10) Patent No.: US 12,739,440 B2
(45) Date of Patent: Sep. 15, 2026

(54) DECODING METHOD AND APPARATUS, ENCODING METHOD AND APPARATUS, AND DEVICES THEREFOR

(71) Applicant: HANGZHOU HIKVISION DIGITAL TECHNOLOGY CO., LTD., Hangzhou (CN)

(72) Inventors: Yucheng Sun, Hangzhou (CN); Xiaoqiang Cao, Hangzhou (CN); Fangdong Chen, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/860,278

(22) PCT Filed: Apr. 26, 2023

(86) PCT No.: PCT/CN2023/090956

§ 371 (c)(1),
(2) Date: Oct. 25, 2024

(87) PCT Pub. No.: WO2023/208069

PCT Pub. Date: Nov. 2, 2023

(65) Prior Publication Data

US 2025/0301176 A1 Sep. 25, 2025

(30) Foreign Application Priority Data

Apr. 27, 2022 (CN) ......................... 202210458047.7

(51) Int. Cl.
*H04N 19/70* (2014.01)
*H04N 19/176* (2014.01)

(52) U.S. Cl.
CPC .......... *H04N 19/70* (2014.11); *H04N 19/176* (2014.11)

(58) Field of Classification Search
CPC ............................ H04N 19/70; H04N 19/176
See application file for complete search history.

(56) References Cited

U.S. PATENT DOCUMENTS 9,525,882 B2 12/2016 Alshina et al.
9,538,194 B2 1/2017 Alshina et al.
(Continued)

FOREIGN PATENT DOCUMENTS

CN 102215389 10/2011
CN 104012095 8/2014
(Continued)

OTHER PUBLICATIONS

Extended European Search Report in European Appln. No. 23795501.8, mailed on Aug. 22, 2025, 9 pages.
(Continued)

*Primary Examiner* — Jonathan R Messmore
(74) *Attorney, Agent, or Firm* — Fish & Richardson P.C.

(57) ABSTRACT

The present disclosure provides a decoding method and apparatus, a coding method and apparatus, and devices therefor. The decoding method includes: determining, based on feature information of a current image region, whether to perform a reconstruction value adjustment on the current image region; if determining to perform the reconstruction value adjustment on the current image region, acquiring an adjustment parameter for the current image region from a bit stream of the current image region; and adjusting a reconstruction value of the current image region based on the adjustment parameter. The present disclosure allows for improved coding and decoding performance.

20 Claims, 7 Drawing Sheets

Determine, based on feature information of a current image region, whether to perform a reconstruction value adjustment on the current image region — 401

↓

If determine to perform the reconstruction value adjustment on the current image region, acquire an adjustment parameter for the current image region from a bit stream of the current image region, where the adjustment parameter is for adjusting a reconstruction value — 402

↓

Adjust a reconstruction value of the current image region based on the adjustment parameter — 403

(56) References Cited

U.S. PATENT DOCUMENTS

| | | | | |
|---|---|---|---|---|
| 9,538,195 | B2 | 1/2017 | Alshina et al. | |
| 9,544,606 | B2 | 1/2017 | Alshina et al. | |
| 9,571,843 | B2 | 2/2017 | Alshina et al. | |
| 10,645,393 | B2 | 5/2020 | Choi et al. | |
| 2009/0316797 | A1 | 12/2009 | Woo et al. | |
| 2010/0002775 | A1* | 1/2010 | Huang | H04N 19/14 375/240.27 |
| 2014/0369420 | A1 | 12/2014 | Alshina et al. | |
| 2015/0189287 | A1 | 7/2015 | Alshina et al. | |
| 2015/0189290 | A1 | 7/2015 | Alshina et al. | |
| 2015/0189295 | A1 | 7/2015 | Alshina et al. | |
| 2015/0189296 | A1 | 7/2015 | Alshina et al. | |
| 2017/0019668 | A1 | 1/2017 | Morigami et al. | |
| 2018/0139449 | A1 | 5/2018 | Choi et al. | |
| 2020/0314445 | A1 | 10/2020 | Park et al. | |
| 2020/0336749 | A1 | 10/2020 | Li et al. | |
| 2020/0349677 | A1 | 11/2020 | Lee et al. | |
| 2021/0021818 | A1 | 1/2021 | Lee et al. | |
| 2021/0281863 | A1 | 9/2021 | Li et al. | |

FOREIGN PATENT DOCUMENTS

| | | | |
|---|---|---|---|
| CN | 107852493 | | 3/2018 |
| CN | 112449181 | | 3/2021 |
| JP | 2010509842 | A | 3/2010 |
| KR | 20190106804 | A | 9/2019 |
| KR | 20190115426 | | 10/2019 |
| WO | WO 2011158657 | A1 | 12/2011 |
| WO | WO 2020012023 | A1 | 1/2020 |
| WO | WO 2022037300 | | 2/2022 |

OTHER PUBLICATIONS

Office Action in Japanese Appln. No. 2024-563448, mailed on Oct. 21, 2025, 6 pages (with English translation).

International Search Report in International Appln. No. PCT/CN2023/090956, mailed on Aug. 28, 2023, 6 pages.

Office Action in Korean Appln. No. 10-2024-7037644, mailed on Feb. 18, 2026, 11 pages (with English translation).

* cited by examiner

DECODING METHOD AND APPARATUS, ENCODING METHOD AND APPARATUS, AND DEVICES THEREFOR

CROSS-REFERENCE TO RELATED APPLICATION

The present application is a U.S. National Stage of International Application No. PCT/CN2023/090956, filed on Apr. 26, 2023, which claims the benefit of priority to Chinese Application No. 202210458047.7, filed on Apr. 27, 2022, the contents of all of which are incorporated by reference herein in their entireties for all purposes.

TECHNICAL FIELD

The present disclosure relates to coding and decoding technologies, in particular to decoding methods and apparatuses, coding methods and apparatuses, and devices therefor.

BACKGROUND

For achieving the purpose of saving spaces, videos or images are transmitted after being coded. A complete video coding may include processes such as prediction, transform, quantization, entropy coding, filtering and so on. The prediction process can include intra prediction and inter prediction. The inter prediction refers to an operation of utilizing a temporal correlation of a video to predict current pixels by using pixels of a neighbouring coded image, so as to achieve the purpose of effectively reducing temporal redundancy of the video. The intra prediction refers to an operation of utilizing a spatial correlation of a video to predict current pixels by using pixels of one or more coded blocks of the current image, so as to achieve the purpose of reducing spatial redundancy of the video.

Lightweighted compression is an image coding method characterized by simple prediction. Lightweighted compression is suitable for scenes with high real-time requirements, small cache and high parallelism requirements. However, in the coding process using lightweighted compression, larger quantization steps often result in larger quantization errors, especially in flat regions. The overall deviation will lead to color blocks, resulting in subjective loss.

SUMMARY

In view of this, the present disclosure provides decoding methods and apparatuses, coding methods and apparatuses, and devices therefor, which improves the coding performance.

The present disclosure provides an image decoding method, performed by a decoding side, the method includes: determining, based on feature information of a current image region, whether performing a reconstruction value adjustment on the current image region is allowed, where the feature information of the current image region includes a prediction mode, and when the prediction mode is a normal intra prediction mode, determining that performing the reconstruction value adjustment on the current image region is allowed; if determining to perform the reconstruction value adjustment on the current image region, acquiring an adjustment parameter for the current image region from a bit stream of the current image region; and adjusting a reconstruction value of the current image region based on the adjustment parameter.

In a possible implementation, the adjustment parameter for the current image region includes a plurality of adjustment values, the current image region corresponds to a plurality of pixel groups, the plurality of adjustment values include adjustment values for K pixel groups which are part of or all the plurality of pixel groups; where the adjusting a reconstruction value of the current image region based on the adjustment parameter includes: for each pixel group in the K pixel groups, if the plurality of adjustment values include an adjustment value for the pixel group, adjusting the reconstruction value of pixel points in the pixel group based on the adjustment value for the pixel group, where K is an integer greater than or equal to 1.

In a possible implementation, if the K pixel groups are part of the plurality of pixel groups, the method further includes: acquiring pixel group indication information corresponding to the K pixel groups from the bit stream of the current image region; and selecting the K pixel groups from all of the pixel groups based on the pixel group indication information; where the pixel group indication information distinguishes pixel groups of a target category among pixel groups of all categories.

In a possible implementation, the current image region corresponding to a plurality of pixel groups includes: determining the plurality of pixel groups corresponding to the current image region according to pixel positions of respective pixel points in the current image region; or, determining the plurality of pixel groups corresponding to the current image region according to a prediction mode of the current image region.

In a possible implementation, the determining the plurality of pixel groups corresponding to the current image region according to a prediction mode of the current image region includes: determining, based on the prediction mode of the current image region, a number of partitions, a filtering region, and a partition manner for partitioning pixel groups; and determining the plurality of pixel groups corresponding to the current image region based on the number of partitions, the filtering region and the partition manner.

In a possible implementation, if the current image region is a 16*2 image block, the determining, based on the prediction mode of the current image region, a number of partitions, a filtering region, and a partition manner for partitioning pixel groups includes: if the prediction mode of the current image region is a horizontal prediction mode, determining that the number of partitions of the pixel group is a first number of partitions, the filtering region of the pixel group is a first filtering region, and the partition manner is a first size specification, where the first number of partitions is 4, and the first size specification is 8*1.

In a possible implementation, if the current image region is a 16*2 image block, the determining, based on the prediction mode of the current image region, a number of partitions, a filtering region, and a partition manner for partitioning pixel groups includes: if the prediction mode of the current image region is a non-horizontal prediction mode, determining that the number of partitions of the pixel group is a second number of partitions, the filtering region of the pixel group is a second filtering region, and the partition manner is a second size specification, where the second number of partitions is 4, and the second size specification is 4*2.

The present disclosure provides an image coding method, performed by a coding side, the method includes: determining, based on feature information of a current image region, whether performing a reconstruction value adjustment on the current image region is allowed, where the feature information of the current image region includes a prediction mode, and when the prediction mode is a normal intra prediction mode, determining that performing the reconstruction value adjustment on the current image region is allowed; if determining to perform the reconstruction value adjustment on the current image region, acquiring an adjustment parameter for the current image region, where the adjustment parameter is for adjusting a reconstruction value of the current image region; and coding the adjustment parameter for the current image region into a bit stream of the current image region.

In a possible implementation, the current image region corresponds to a plurality of pixel groups, the adjustment parameter for the current image region includes a plurality of adjustment values, the plurality of adjustment values include adjustment values for K pixel groups which are part of or all the plurality of pixel groups.

In a possible implementation, the current image region corresponding to a plurality of pixel groups includes: determining the plurality of pixel groups corresponding to the current image region according to pixel positions of respective pixel points in the current image region; or, determining the plurality of pixel groups corresponding to the current image region according to a prediction mode of the current image region.

In a possible implementation, the determining the plurality of pixel groups corresponding to the current image region according to a prediction mode of the current image region includes: determining, based on the prediction mode of the current image region, a number of partitions, a filtering region, and a partition manner for partitioning pixel groups; and determining the plurality of pixel groups corresponding to the current image region based on the number of partitions, the filtering region and the partition manner.

In a possible implementation, if the current image region is a 16*2 image block, the determining, based on the prediction mode of the current image region, a number of partitions, a filtering region, and a partition manner for partitioning pixel groups includes: if the prediction mode of the current image region is a horizontal prediction mode, determining that the number of partitions of the pixel group is a first number of partitions, the filtering region of the pixel group is a first filtering region, and the partition manner is a first size specification, where the first number of partitions is 4, and the first size specification is 8*1.

In a possible implementation, if the current image region is a 16*2 image block, the determining, based on the prediction mode of the current image region, a number of partitions, a filtering region, and a partition manner for partitioning pixel groups includes: if the prediction mode of the current image region is a non-horizontal prediction mode, determining that the number of partitions of the pixel group is a second number of partitions, the filtering region of the pixel group is a second filtering region, and the partition manner is a second size specification, where the second number of partitions is 4, and the second size specification is 4*2.

The present disclosure provides an image decoding apparatus, which includes: a memory, configured to store video data; and a decoder, configured to implement: determining, based on feature information of a current image region, whether performing a reconstruction value adjustment on the current image region is allowed, where the feature information of the current image region includes a prediction mode, and when the prediction mode is a normal intra prediction mode, determining that performing the reconstruction value adjustment on the current image region is allowed; if determining to perform the reconstruction value adjustment on the current image region, acquiring an adjustment parameter for the current image region from a bit stream of the current image region; and adjusting a reconstruction value of the current image region based on the adjustment parameter.

The present disclosure provides an image coding apparatus, which includes: a memory, configured to store video data; and a coder, configured to implement: determining, based on feature information of a current image region, whether performing a reconstruction value adjustment on the current image region is allowed, where the feature information of the current image region includes a prediction mode, and when the prediction mode is a normal intra prediction mode, determining that performing the reconstruction value adjustment on the current image region is allowed; if determining to perform the reconstruction value adjustment on the current image region, acquiring an adjustment parameter for the current image region, where the adjustment parameter is for adjusting a reconstruction value of the current image region; and coding the adjustment parameter for the current image region into a bit stream of the current image region.

The present disclosure provides an image decoding device, including a processor and a machine-readable storage medium, where the machine-readable storage medium stores machine-executable instructions executable by the processor, and the processor is configured to execute the machine-executable instructions to implement the image decoding method.

The present disclosure provides an image coding device, including a processor and a machine-readable storage medium, where the machine-readable storage medium stores machine-executable instructions executable by the processor, and the processor is configured to execute the machine-executable instructions to implement the image coding method.

The present disclosure provides a non-transitory machine-readable storage medium, on which computer instructions are stored, and when the computer instructions are executed by at least one processor, the above image decoding method or image coding method is realized.

As can be seen from the above technical solutions, a lightweighted compression method is proposed in the embodiment of the present disclosure, which can be applied to scenes with high real-time requirements, small cache and high parallelism requirements. After a reconstruction value of a current image region is obtained, the reconstruction value of the current image region can also be adjusted, so that a reconstructed pixel can be closer to an original pixel, and the coding performance and decoding performance can be improved. For a large quantization step, reducing quantization error method flat regions, reducing the color block problem caused by overall deviation can reduce subjective loss, i.e., lightweighted compression method can achieve subjective loss and hardware implementation is simple.

DETAILED DESCRIPTION

Figures 1A, 1B, 1C:
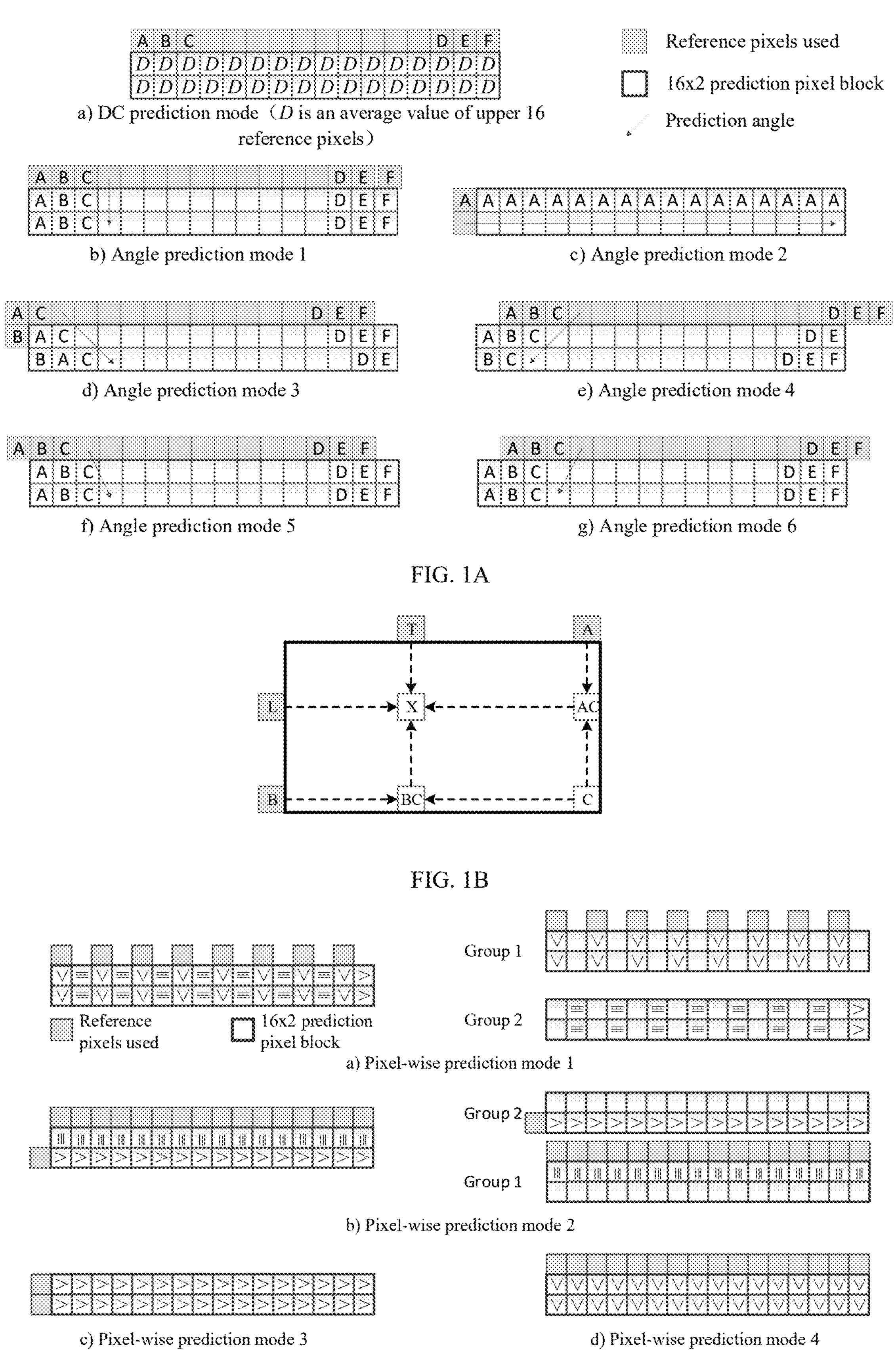
FIGS. 1A to 1C are schematic diagrams of a working principle of intra prediction mode.

Terms used in embodiments of the present disclosure are only for a purpose of describing specific embodiments, and are not intended to limit the present disclosure. Singular forms of "a", "said", and "the" used in the embodiments of present disclosure and in the claims are also intended to include majority forms, unless the context clearly indicates otherwise. It should also be understood that the term "and/or" as used herein refers to any or all of the possible combinations containing one or more of the listed items in association. It should be understood that although terms first, second, third, etc. may be used to describe various information in the embodiments of the present disclosure, these information should not be limited to these terms. These terms are used only to distinguish the same type of information from one another. For example, without departing from the scope of the embodiments of the present disclosure, first information can also be called second information, and similarly, the second information can also be called the first information, depending on the context. In addition, the word "if" used can be interpreted as "at" or "when" or "in response to determining".

Embodiments of the present disclosure provide decoding methods and apparatuses, coding methods and apparatuses, and devices therefor, which can relate to the following concepts:

Intra prediction, inter prediction and Intra Block Copy (IBC) prediction.

The intra prediction refers to, based on a spatial correlation of a video, predicting pixels of a current block by using pixels of one or more coded blocks of current image, so as to achieve the purpose of reducing spatial redundancy of the video. The intra prediction specifies a variety of prediction modes, and each prediction mode corresponds to a texture direction (except Direct Current (DC) mode). For example, if image textures are arranged horizontally, a horizontal prediction mode can better predict image information.

The inter prediction refers to, based on a temporal correlation of a video, since a video sequence contains strong temporal correlation, using pixels of the neighboring coded images to predict pixels of a current image can achieve the purpose of effectively reducing temporal redundancy of the video. Block-based motion compensation technology is used in the inter prediction of video coding standards. The main principle is to find a best matching block for each pixel block of the current image in a previously coded image. This process is named as Motion Estimation (ME).

Intra block copying refers to allowing reference within the same frame, where reference data for a current block comes from the same frame. In the intra block copy technology, a prediction value of the current block can be obtained by using a block vector of the current block. For example, based on the characteristic that there are a large number of repeated textures in the same frame in a screen content, compression efficiency of a screen content sequence can be improved when the prediction value of the current block is obtained by using the block vector.

A prediction pixel refers to a pixel value derived from already coded and decoded pixels. A residual is obtained by calculating a difference between an original pixel and the prediction pixel. This residual is then subjected to residual transformation, quantization, and coefficient coding. Inter prediction pixel refers to a pixel value of the current block derived from a reference frame. Because pixel positions are discrete, it is necessary to obtain a final prediction pixel through interpolation operation. The closer the predicted pixel is to the original pixel, the smaller the residual energy obtained by subtracting them, and the higher the coding compression performance.

Intra prediction mode: in intra-coding, intra prediction mode is used for motion compensation, i.e., the prediction value of the current block is obtained by using intra prediction mode, which is a prediction mode using a reconstruction value and prediction value of the current frame. For example, intra prediction modes may include, but are not limited to, DC mode, bilinear mode, angle prediction mode (such as horizontal angle prediction mode, vertical angle prediction mode, etc., which is not limited to any angle, such as 33 angle modes or 65 angle modes, etc.), IBC mode, Intra String Copy (ISC) mode, Planar mode, pixel-wise prediction mode, etc.

The DC mode and the angle prediction mode can be seen in FIG. 1A. The DC mode is suitable for a large flat region, and an average value of surrounding pixels of the current block is taken as a prediction value of a current block. The angle prediction mode takes a value of the surrounding pixels of the current block pointed at an angle as a prediction value of a current block. In FIG. 1A, a) is a schematic illustration of a DC mode in which an average value of 16 reference pixels on an upper side of "D" is taken as a predicted value of "D". b) is a schematic diagram of angle prediction mode 1, which indicates that a value of a reference pixel pointed by an angle is a predicted value of the current block. c) is a schematic diagram of angle prediction mode 2, d) is a schematic diagram of angle prediction mode 3, e) is a schematic diagram of angle prediction mode 4, f) is a schematic diagram of angle prediction mode 5, and g) is a schematic diagram of angle prediction mode 6.

The bilinear mode, i.e., the bilinear interpolation mode, is shown in FIG. 1B. A prediction process of the bilinear mode is as follows: first, a predicted value of a lower right corner C position is generated (weighted average of an upper right corner reference pixel A and a lower left corner reference pixel B), then a predicted value of a right boundary AC position is generated (weighted average of predicted values of the upper right corner reference pixel A and the lower right corner C position), and then a predicted value of a lower boundary BC position (weighted average of predicted values of the lower left corner reference pixel B and the lower right corner C position), and predicted values of remaining other internal pixel points (e.g., a predicted value of X position) are generated by weighted averaging predicted values produced by horizontal linear prediction and predicted values produced by vertical linear prediction. The predicted value generated by horizontal linear prediction is a weighted average of predicted values of a left corresponding position reference pixel L and the right boundary AC position. The predicted value generated by vertical linear prediction is a weighted average of predicted values of an upper corresponding position reference pixel T and the lower boundary BC position.

The Planar mode (or Plane mode) is suitable for regions where pixel values slowly change, using two linear filters in horizontal and vertical directions to take average of pixels in both directions as a predicted value for the current block pixel. The Planar mode is a gradual mode, and the Planar mode is an intra prediction mode that uses reference pixels in different positions and different weight parameters to get prediction values.

The ISC mode is to arrange pixels in the current block into a number of one-dimensional pixel groups in a certain scanning order (generally horizontal raster scanning order or vertical raster scanning order), and each pixel group performs similar motion estimation to obtain a predicted value of the pixel group.

The pixel-wise prediction mode, see FIG. 1C for a schematic diagram of four pixel-wise prediction modes for a 16*2 pixel block. For example, there are four kinds of pixel-wise prediction modes for a 16*2 pixel block, and each pixel-wise prediction mode uses a 16*2 block as a basic unit for prediction. In FIG. 1C, ≡ indicates averaging reconstruction values of left and right side pixels to obtain a predicted value of a current pixel; ||| indicates averaging reconstruction values of top and bottom side pixels to obtain the predicted value of the current pixel; > indicates directly adopting a reconstruction value of the left side pixel as the predicted value of the current pixel; V indicates directly adopting a reconstruction value of the top side pixel as the predicted value of the current pixel. As can be seen from FIG. 1C, for pixel-wise prediction mode 1, a prediction of Group2 needs to rely on a reconstruction of Group1. For pixel-wise prediction mode 2, a prediction of Group1 needs to rely on a reconstruction of Group2.

Rate-Distortion Optimization (RDO) principle: There are two major indicators to evaluate coding efficiency: rate and Peak Signal to Noise Ratio (PSNR). The smaller the bit stream, the greater the compression rate and PSNR, and the better the reconstructed image quality. In mode selection, a discriminant formula is essentially a comprehensive evaluation of the two. For example, a cost corresponding to a mode: $j\ (\text{mode})=D+\lambda*R$, where D stands for Distortion, which can usually be measured by Sum of the Squared Errors (SSE) index. SSE refers to a mean square sum of differences between a reconstructed image block and a source image. In order to realize cost consideration, SAD index can also be used, and SAD refers to a sum of absolute values of differences between the reconstructed image block and the source image. λ is Lagrange multiplier, and R is an actual number of bits required for image block coding in this mode, including total bits required for coding mode information, motion information, residuals, etc. In mode selection, if the coding mode is compared and decided according to the usage of RRO principle, the best coding performance can usually be guaranteed.

Rate control: to control a stability of rate, generally by adjusting a quantization step to achieve the purpose of rate stability.

Lightweighted compression: Lightweighted compression is an image coding method, which is characterized by simple prediction. Lightweighted compression is suitable for application scenes with high real-time requirements, small cache and high parallelism requirements. A compression efficiency of lightweighted compression is low, intra prediction can be used, and a compression ratio is low (for example, generally less than 10 times). In the process of realizing lightweighted compression, subjective lossless and simple hardware implementation are generally required.

Figure 2A:
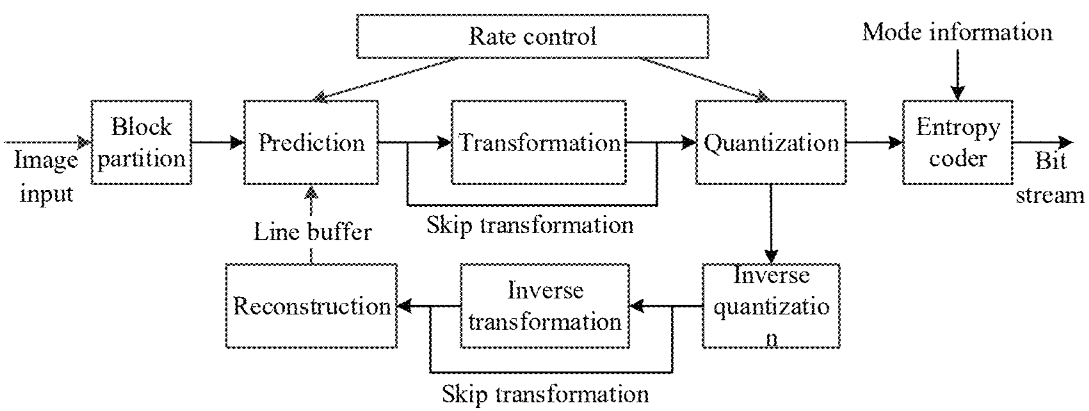
FIGS. 2A to 2D are schematic diagrams of a video coding framework for lightweighted compression.

A video coding framework of lightweighted compression: as shown in FIG. 2A, it is a schematic diagram of a video coding framework of a coding side, which can be used to realize a processing flow of a coding side in this embodiment, i.e., to realize lightweighted compression. A schematic diagram of a video decoding frame at a decoding side is similar to that in FIG. 2A, which is not repeated here. The video decoding frame can be used to realize a processing flow at a decoding side of the embodiment of the present disclosure.

For example, as shown in FIG. 2A, the video coding framework may include modules such as block partition, prediction, transformation, quantization, rate control, entropy coder, inverse quantization, inverse transformation, and reconstruction. At the coding side, through cooperation between these modules, the coding side processing flow can be realized. In addition, the video decoder framework may include modules such as block partition, prediction, transformation, quantization, rate control, entropy decoder, inverse quantization, inverse transformation, and reconstruction. In this case, the rate control module belonging to the coding side can also act on the decoding side to save a coding cost of quantization parameters and control a prediction mode. Or, the video decoder framework may include modules such as block partition, prediction, transformation, quantization, entropy decoder, inverse quantization, inverse transformation, and reconstruction, etc. In this case, there is no rate control module. At the decoding side, through cooperation between these modules, the decoding side processing flow can be realized.

For example, in a lightweighted compression scenario, the rate control technology is applied to a rate control unit, which is the scope of rate control, indicating that a rate control operation is performed on the range corresponding to the rate control unit. For example, the rate control unit can be several image blocks, or several pixel rows, or a whole Slice, or several pixel blocks inside the Slice, or several pixel rows inside the Slice, etc. The above are just a few examples of the rate control unit, and there is no restriction on the rate control unit. On this basis, pixel blocks in each rate control unit can be predicted, transformed and quantized, and the mode selection of the prediction part is participated by the rate control. After the pixel blocks are reconstructed, reconstruction value adjustment operations can be performed.

Figure 2B:
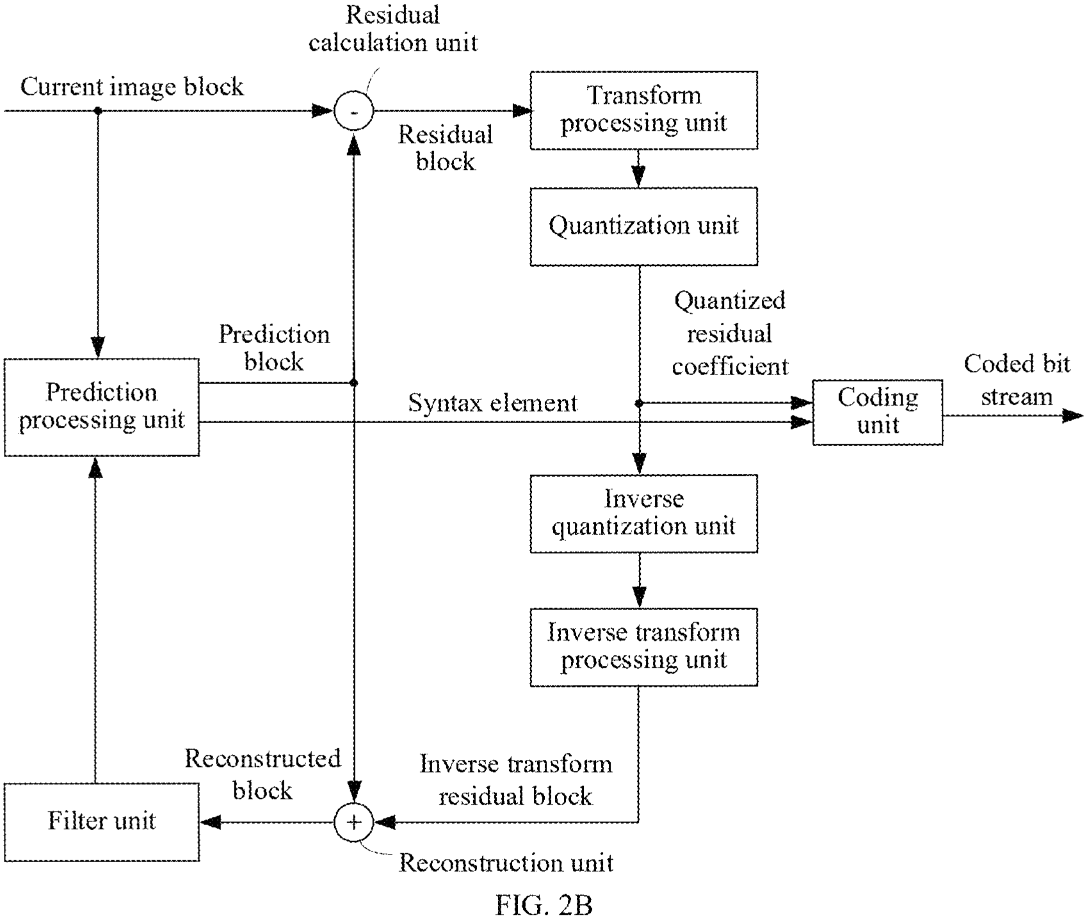

Structures of the coding side and decoding side are briefly introduced below. Referring to FIG. 2B, a schematic block diagram for implementing a coding side of an embodiment of the present disclosure is shown. In FIG. 2B, the coding side may include a prediction processing unit, a residual calculation unit, a transform processing unit, a quantization unit, a coding processing unit, an inverse quantization unit (also named as dequantization unit), an inverse transform processing unit (also named as reverse transform processing unit), a reconstruction unit (or named as rebuild unit) and a filter unit. In an example, the coding side may further include a buffer and a decoded image buffer, where the buffer is configured to buffer a reconstructed image block output by the reconstruction unit and the decoded image buffer is configured to buffer a filtered image block output by the filter unit.

An input of the coding side (also named as a coder) can be an image block of an image (which can be named as a to-be-coded image), and the image block can also be named as a current block or a to-be-coded block, and the coding side can further include a segmentation unit (not shown in the figure) for partitioning the to-be-coded image into a plurality of image blocks. The coding side can code the plurality of image blocks block by block thereby completing coding of the to-be-coded image, e.g., performing the coding process for each image block. The prediction processing unit configured to receive or acquire the image block (a current to-be-coded image block of a current to-be-coded image, which may also be named as a current block, which may be understood as a real value of the image block) and the reconstructed image data, and obtain a prediction block of the current block by predicting a current block based on relevant data in the reconstructed image data. In an example, the prediction processing unit may include an inter prediction unit, an intra prediction unit, and a mode selection unit, the mode selection unit is configured to select an intra prediction mode or an inter prediction mode, and if the intra prediction mode is selected, the intra prediction unit performs a prediction process, and if the inter prediction mode is selected, the inter prediction unit may perform a prediction process.

The residual calculation unit is configured to obtain a residual block by calculating a residual between a true value of an image block and a prediction block of the image block, for example, the residual calculation unit can subtract a pixel value of the prediction block from a pixel value of the image block pixel by pixel.

The transform processing unit is configured to perform a transform, such as a discrete cosine transform (DCT) or a discrete sine transform (DST), on the residual block to obtain a transform coefficient in a transform domain, the transform coefficient may also be named as a transform residual coefficient, and the transform residual coefficient may represent the residual block in the transform domain.

The quantization unit is configured to quantize a transform coefficient by applying scalar quantization or vector quantization to obtain a quantized transform coefficient, which can also be named as a quantized residual coefficient. A quantization process can reduce a bit depth associated with some or all of the transform coefficients. For example, a n-bit transform coefficient may be rounded down to a m-bit transform coefficient during quantization, where n is greater than m. A quantization degree can be modified by adjusting a quantization parameter (QP). For example, for scalar quantization, different scales can be applied to achieve finer or coarser quantization. A smaller quantization step corresponds to a finer quantization, while a larger quantization step corresponds to a coarser quantization. An appropriate quantization step can be indicated by a quantization parameter.

The coding processing unit is configured to code the quantized residual coefficient and a part of coding parameters, output coded image data (i.e. A coding result of the current to-be-coded image block) and coded coding parameters in the form of a coded bit stream, and then transmit the coded bit stream to a decoder, or store it for later transmission to the decoder or for retrieval. The coding processing unit 205 can further be configured to code other syntax elements of the current image block, such as coding a prediction mode into a bit stream. Coding algorithms include, but are not limited to, a variable length coding (VLC) algorithm, a context adaptive VLC (CAVLC) algorithm, an arithmetic coding algorithm, a context adaptive binary arithmetic coding, CABAC) algorithm, a syntax-based context-adaptive binary arithmetic coding (SBAC) algorithm, and a probability interval partitioning entropy (PIPE) algorithm.

The inverse quantization unit is configured to perform inverse quantization on the aforementioned quantized residual coefficient to acquire an inverse quantized coefficient. The inverse quantization is a reverse application of the quantization unit, for example, based on or using the same quantization step as the quantization unit, an inverse quantization scheme corresponding to the quantization scheme applied by the quantization unit is applied. The inverse quantized coefficient can also be named as inverse quantized residual coefficient.

The inverse transform processing unit is configured to perform inverse transformation on the aforementioned inverse-quantized coefficient. It should be understood that this inverse transform is an inverse application of the above-mentioned transform processing unit. For example, the inverse transform may include an inverse discrete cosine transform (IDCT) or an inverse discrete sine transform (IDST) to obtain an inverse transform block in a pixel domain (or sample domain). The inverse transform block can also be named as an inverse transform inverse-quantized block or inverse transform residual block.

The reconstruction unit is configured to add the inverse transform block (i.e., inverse transform residual block) to the prediction block to obtain a reconstructed block in the sample domain. The reconstruction unit can be a summator, for example, adding a sample value (i.e., pixel value) of the residual block to a sample value of the prediction block. The reconstructed block output by the reconstruction unit can be subsequently configured to predict other image blocks, for example, in an intra prediction mode.

The filter unit (or simply named as "filter") is configured to filter the reconstructed block to obtain a filtered block, so as to smoothly perform pixel conversion or improve image quality. The filter unit may be a loop filter unit, intended to represent one or more loop filters. For example, the filter unit may be a deblocking filter, a sample-adaptive offset (SAO) filter or other filters, such as a bilateral filter, an adaptive loop filter (ALF), a sharpening or smoothing filter, or a cooperative filter. In an example, the filtered block output by the filter unit may be subsequently configured to predict other image blocks, for example, in an inter prediction, which is not limited.

Figure 2C:
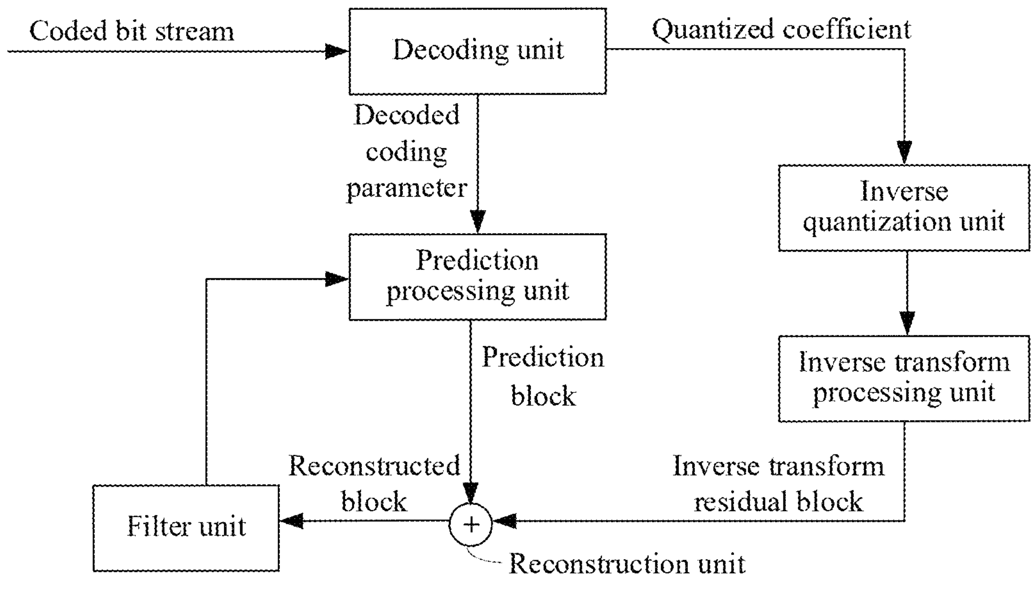

Referring to FIG. 2C, a schematic block diagram for implementing a decoding side (which can also be named as a decoder) of an embodiment of the present disclosure is shown. The decoder is configured to obtain a decoded image by receiving, for example, coded image data (i.e., a coded bit stream, e.g., a coded bit stream including image blocks and associated syntax elements) coded by the coder. The decoder includes a decoding unit, an inverse quantization unit, an inverse transform processing unit, a prediction processing unit, a reconstruction unit and a filter unit. In some embodiments, the decoder may perform a decoding process that is substantially inverse to the coding process described by the coder of FIG. 2B. In an example, the decoder may further include a buffer and a decoded image buffer, where the buffer is configured to buffer a reconstructed image block output by the reconstruction unit and the decoded image buffer is configured to buffer a filtered image block output by the filter unit.

The decoding unit is configured to perform decoding on coded image data to obtain quantized transform coefficients and/or decoded coding parameters (for example, the coding parameters may include any one or more of inter prediction parameters, intra prediction parameters, filter parameters and/or other syntax elements). The entropy decoding unit is further configured to forward the aforementioned decoded coding parameters to the prediction processing unit for the prediction processing unit to perform a prediction process according to the coding parameters. The function of the inverse quantization unit can be the same as that of the inverse quantization unit of the coder, configured to inverse quantization (i.e., dequantization) of a quantized transform coefficient decoded by the decoding unit.

The function of the inverse transform processing unit can be the same as that of the inverse transform processing unit of the coder, and it is configured to perform inverse transform (e.g., inverse DCT, inverse integer transform or conceptually similar inverse transform process) on the aforementioned quantized transform coefficient, so as to obtain an inverse transform block (also named as inverse transform residual block), that is, the inverse transform block is an inverse transform block of a current image block in a pixel domain.

The prediction processing unit is configured to receive or acquire coded image data (for example, the coded bit stream of the current image block) and reconstructed image data, and the prediction processing unit can further receive or acquire prediction related parameters and/or information about a selected prediction mode (i.e., decoded coding parameters) from, for example, the entropy decoding unit, and predict the current image block based on the related data in the reconstructed image data and the decoded coding parameters to obtain a prediction block of the current image block.

In an example, the prediction processing unit may include an inter prediction unit, an intra prediction unit, and a mode selection unit, the mode selection unit is configured to select an intra prediction mode or an inter prediction mode, and if the intra prediction mode is selected, the intra prediction unit performs a prediction process, and if the inter prediction mode is selected, the inter prediction unit performs a prediction process.

The function of the reconstruction unit (e.g., summer) may be the same as that of the coder, and the reconstruction unit is configured to add an inverse transform block (i.e., an inverse transform residual block) to the prediction block to obtain a reconstructed block in a sample domain, for example, to add a sample value of the inverse transform residual block to a sample value of the prediction block.

The filter unit is configured to filter the reconstructed block to obtain a filtered block, which is a decoded image block.

It should be understood that in the coder and decoder of the embodiment of the present disclosure, a processing result for a certain link can also be further processed and output to a next link, for example, after interpolation filtering, motion vector derivation or filtering, a processing result of the corresponding link can be further subjected to operations such as Clip or shift.

Figure 2D:
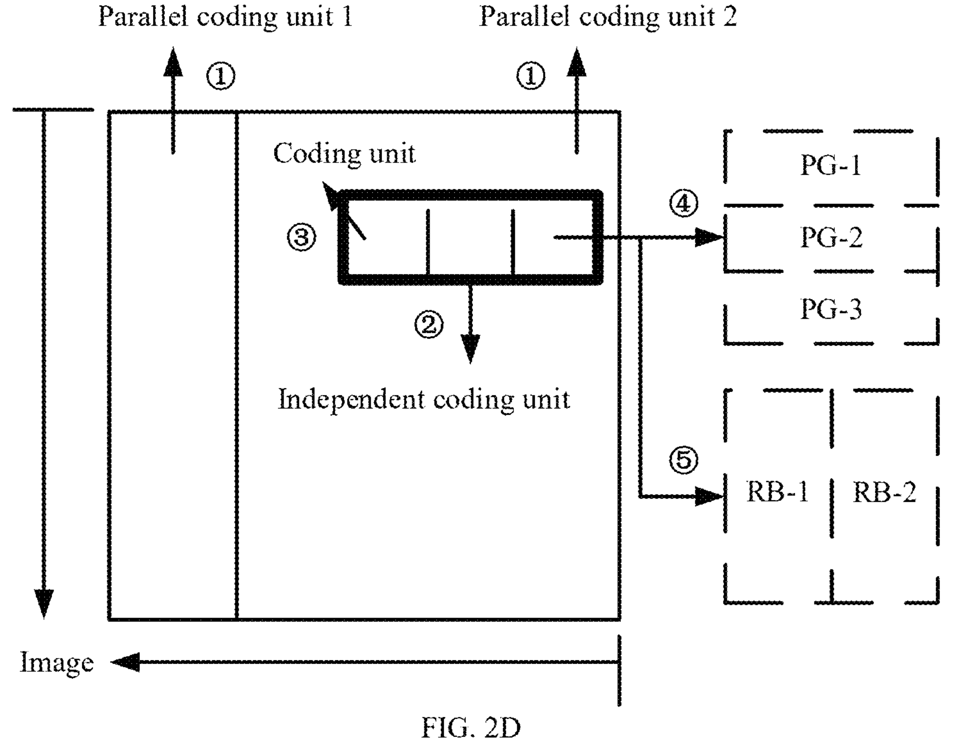

On the basis of the coder and the decoder, an embodiment of the present disclosure provides a possible coding/decoding implementation, as shown in FIG. 2D, which is a flow diagram of coding and/or decoding provided by the embodiment of the present disclosure, and the coding and decoding implementation includes process ① to process ⑤, which can be executed by the above-mentioned decoder and/or coder. Process ①: a frame of image is partitioned into one or more non-overlapping parallel coding units. There is no dependency between the one or more parallel coding units, which can be completely parallel/independent coding and decoding, such as parallel coding unit 1 and parallel coding unit 2 shown in FIG. 2D.

Process ②: for each parallel coding unit, it can be partitioned into one or more independent coding units that are not overlapped with each other, and the independent coding units can be independent of each other, but they can share some parallel coding unit header information. For example, a width of an independent coding unit is w_lcu and a height is h_lcu. If the parallel coding unit is partitioned into an independent coding unit, the dimension of the independent coding unit is exactly the same as that of the parallel coding unit. Otherwise, the width of the independent coding unit should be greater than the height (unless it is an edge region).

Generally, the independent coding unit can be a fixed w_lcu×h_lcu, and both w_lcu and h_lcu are Nth power of 2 (N≥0). For example, the size of independent coding unit can be: 128×4, 64×4, 32×4, 16×4, 8×4, 32×2, 16×2 or 8×2, etc.

As a possible example, the independent coding unit may be a fixed 128×4. If the size of the parallel coding unit is 256×8, the parallel coding unit can be equally partitioned into four independent coding units. If the size of the parallel coding unit is 288×10, the parallel coding unit can be partitioned into: the first, second row consists of two independent coding units of 128×4+one independent coding unit of 32×4, and the third row consists of two independent coding units of 128×2+one independent coding unit of 32×2. It is worth noting that the independent coding unit can either include three components of luma Y, chroma Cb, and chroma Cr, or the three components of red (R), green (G), and blue (B), or only one of three components of luma Y, chroma Cb, and chroma Cr. If the independent coding unit contains three components, the sizes of these three components can be exactly the same or different, which is related to an input format of the image.

Process ③: for each independent coding unit, it can be further partitioned into one or more non-overlapping coding units, and each coding unit in the independent coding unit can depend on each other, e.g., multiple coding units can be cross-referenced to pre-coding/decoding.

If the coding unit has the same size as the independent coding unit (i.e., the independent coding unit is only partitioned into one coding unit), its size can be all the sizes described in process ②. If an independent coding unit is partitioned into a plurality of coding units that do not overlap with each other, feasible partition examples include: horizontal partition (the height of the coding unit is the same as that of the independent coding unit, but the widths are different, and may be ½, ¼, ⅛, 1/16, etc.) and vertical partition (the coding unit is the same as the independent coding unit, but the heights are different, which can be ½, ¼, ⅛, 1/16, etc.), horizontal and vertical equal partition (quadratic tree partition), etc., with horizontal equal partition being preferred.

If the width of the coding unit is w_cu and the height is h_cu, its width should be greater than its height (except in the edge region). Generally, the coding unit can be fixed w_cu×h_cu, and both w_cu and h_cu are Nth power of 2 (N is greater than or equal to 0), such as 16×4, 8×4, 16×2, 8×2, 8×1, 4×1, etc. As a possible example, the coding unit may be a fixed 16×4. If the size of the independent coding unit is 64×4, the independent coding unit can be equally partitioned into four coding units. If the size of the independent coding unit is 72×4, the coding unit is partitioned into four 16×4+one 8×4. It worth noting that the coding unit can either contain three components of luma Y, chroma Cb, and chroma Cr (or three components of red R, green G, and blue B, or luma Y, chroma Co, and chroma Cg), or only one of these components. If there are three components, the dimensions of several components can be exactly the same or different, which related to an image input format.

It is worth noting that process ③ can be an optional step in the coding and decoding method, and the coder/decoder can code/decode residual coefficient (or residual value) of the independent coding unit obtained in process ②.

Process ④: for the coding unit, it can be further partitioned into one or more non-overlapping prediction groups (PG). PG can also be referred to as Group. Each PG is coded and decoded according to a selected prediction mode to obtain a prediction value of the PG, which constitutes a prediction value of the whole coding unit. Based on the prediction value of the coding unit and an original value, a residual value of the coding unit can be obtained.

Process ⑤: based on the residual value of the coding unit, the coding unit is grouped to obtain one or more non-overlapping residual sub-blocks (or residual block, RB), and residual coefficients of each RB are coded and decoded according to the selected mode to form a residual coefficient stream. Specifically, it can be partitioned into two categories: transforming the residual coefficients and not transforming them.

The selected mode of residual coefficient coding and decoding method in process ⑤ may include but not limited to any of the following: semi-fixed length coding method, exponential Golomb coding method, Golomb-Rice coding method, truncated unary code coding method, run-length coding method, direct coding of original residual value, etc. For example, the coder can directly code coefficients within an RB. For another example, the coder can also transform the residual block, such as DCT, DST and Hadamard transform, and then code the transformed coefficients. As a possible example, when the RB is small, the coder can directly perform uniform quantization on each coefficient in the RB, and then perform binary coding. If the RB is large, it can be further partitioned into multiple coefficient groups (CG), and each CG can be uniformly quantified and then binarized for coding. In some embodiments of the present disclosure, the coefficient group (CG) and the quantization group (QG) may be the same, but of course, the coefficient group and the quantization group may also be different.

The following is an example explanation of the residual coefficient coding using a semi fixed length coding method. Firstly, a maximum absolute value of residual in an RB block is defined as modified maximum (mm). Secondly, the number of coded bits of a residual coefficient in the RB block is determined (the number of coded bits of the residual coefficient in the same RB block is the same). For example, if a critical limit (CL) of the current RB block is 2 and a current residual coefficient is 1, the coding residual coefficient 1 needs 2 bits, which is expressed as 01. If the CL of the current RB block is 7, it indicates coding 8-bit residual coefficient and 1-bit sign bit. The determination of CL is to find a minimum T value that satisfies that all residuals of a current sub-block are within the range of $[-2^{(T-1)}, 2^{(T-1)}]$. If both $-2^{(T-1)}$ and $2^{(T-1)}$ boundary values are present, T is increased by one, i.e., T+1 bits are required to code all the residuals of the current RB block, if only one of $-2^{(T-1)}$ and $2^{(T-1)}$ boundary values is present, a Trailing bit is coded to determine whether the boundary value is $-2^{(T-1)}$ or $2^{(T-1)}$, and if none of the residuals is present in either of the two $-2^{(T-1)}$ or $2^{(T-1)}$, there is no need to code the Trailing bit. For some special cases, the coder can directly code the original value of the image instead of the residual value.

For example, lightweighted compression is an image coding method, which is characterized by simple prediction. Lightweighted compression is suitable for scenes with high real-time requirements, small cache and high parallelism requirements. However, in the coding process of lightweighted compression, larger quantization steps often result in larger quantization errors, especially in flat regions, and the overall deviation will lead to color blocks, which will lead to subjective loss.

Subjective loss in the present disclosure means that the human eye can perceive a difference between the reconstructed image and the source image, which can be determined by alternately playing the reconstructed image and the source image at a specific frequency (for example, 8 Hz) at a suitable observation distance.

In order to solve the above problems, a lightweighted compression filtering method is proposed in the embodiment of the present disclosure, which can be applied to scenes with high real-time requirements, small cache and high parallelism requirements. After a reconstruction value of a current image region is obtained, the reconstruction value of the current image region can be adjusted, so that a reconstructed pixel can be closer to an original pixel, and the coding performance and decoding performance can be improved. For a large quantization step, reducing quantization error, especially in flat regions, reducing the color block problem caused by overall deviation can reduce subjective loss and improve subjective performance. In the coding process of lightweighted compression, subjective loss can be realized and hardware implementation is simple.

In the following, the decoding method and coding method in the embodiments of the present disclosure will be described in detail with several specific embodiments.

Figures 3, 4, 5A:
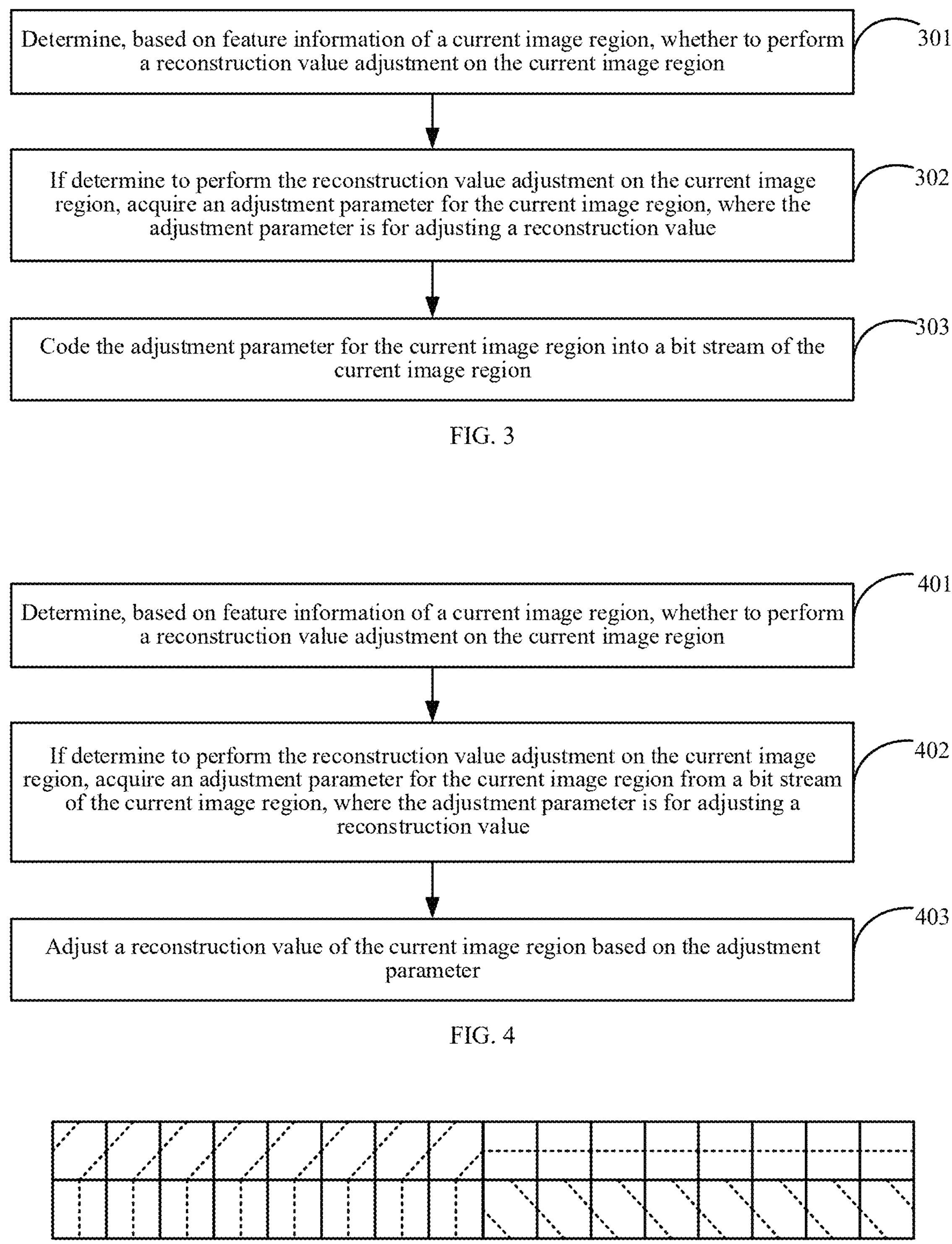
FIG. 3 is a flowchart of a coding method in an embodiment of the present disclosure.
FIG. 4 is a flowchart of a decoding method in an embodiment of the present disclosure.
FIGS. 5A to 5D are schematic diagrams of image block partition in an embodiment of the present disclosure.

Embodiment 1: A coding method is proposed in an embodiment of the present disclosure, as shown in FIG. 3, which is a schematic flowchart of the coding method. The method can be performed by a coding side (also named as a video coder), and may include:

at step 301, determine, based on feature information of a current image region, whether to perform a reconstruction value adjustment on current image region.

In a possible embodiment, an explicit method can be used to determine whether there is a need to adjust a reconstruction value of the current image region. For the convenience of distinction, feature information involved in the explicit method is named as feature information of a first type and further abbreviated as first feature information.

For example, the first feature information of the current image region can be obtained. If the first feature information of the current image region meets a specific condition (such as a first specific condition), it is determined whether to perform the reconstruction value adjustment on the current image region, a flag bit corresponding to an adjustment control switch is coded into a bit stream of the current image region based on the determination result, and the flag bit indicates whether to perform the reconstruction value adjustment on the current image region. If the first feature information of the current image region does not meet the specific condition, it is determined that there is no need to perform the reconstruction value adjustment on the current image region, and the flag bit corresponding to the adjustment control switch is not coded in the bit stream of the current image region.

When the first feature information meets the specific condition, and if it is determined that there is a need to perform the reconstruction value adjustment on the current image region, the flag bit corresponding to the adjustment control switch is coded in the bit stream of the current image region, and the flag bit is a first value, indicating by the first value that there is a need to perform the reconstruction value adjustment on the current image region. If it is determined that there is no need to perform the reconstruction value adjustment on the current image region, the flag bit corresponding to the adjustment control switch is coded in the bit stream of the current image region, and the flag bit is a second value, indicating by the second value that there is no need to perform reconstruction value adjustment on the current image region. The first value and the second value can be configured according to experience, which is not limited. For example, the first value is 1 and the second value is 0.

Regarding the process of "determining whether to perform a reconstruction value adjustment on current image region", if a cost value of starting the reconstruction value adjustment of the current image region is less than a cost value of turning off the reconstruction value adjustment of the current image region, then determine to perform the reconstruction value adjustment on the current image region; otherwise, determine not to perform the reconstruction value adjustment on the current image region.

For example, the current image region may include one image block, or the current image region may include a plurality of consecutive image blocks. The bit stream of the current image region means: a bit stream related to the current image region, i.e., there is information in the bit stream for processing the current image region, for which there is no restriction on the bit stream of the current image region.

For example, the first feature information of the current image region may include but not limited to at least one of the following: a prediction mode, data amount in a bit stream buffer or a quantization step. Based on this, if the first feature information includes the prediction mode, determining that the prediction mode meets the specific condition when the prediction mode corresponding to the current image region is a specified prediction mode, otherwise, determining that the prediction mode does not meet the specific condition. If the first feature information includes the data amount in the bit stream buffer, determining that the data amount in the bit stream buffer meets the specific condition when the data amount in the bit stream buffer is within a preset data amount interval, otherwise, determining that the data amount in the bit stream buffer does not meet the specific condition. If the first feature information includes the quantization step, determining that the quantization step meets the specific condition when the quantization step corresponding to the current image region is within a preset step interval, otherwise, determining that the quantization step does not meet the specific condition.

If the first feature information includes the prediction mode and the data amount in the bit stream buffer, determining that the first feature information of the current image region meets the specific condition only when the prediction mode meets the specific condition and the data amount in the bit stream buffer also meets the specific condition, otherwise, determining that the first feature information of the current image region does not meet the specific condition. Or, if the first feature information includes the quantization step and the data amount in the bit stream buffer, determining that the first feature information of the current image region meets the specific condition only when the quantization step meets the specific condition and the data amount in the bit stream buffer also meets the specific condition, otherwise, determining that the first feature information of the current image region does not meet the specific condition. Or, if the first feature information includes the prediction mode and the quantization step, determining that the first feature information of the current image region meets the specific condition only when the prediction mode meets the specific condition and the quantization step also meets the specific condition, otherwise, determining that the first feature information of the current image region does not meet the specific condition. If the first feature information includes the prediction mode, the data amount in the bit stream buffer and the quantization step, determining that the first feature information of the current image region meets the specific condition only when the prediction mode meets the specific condition, the data amount in the bit stream buffer meets the specific condition and the quantization step also meets the specific condition, otherwise, determining that the first feature information of the current image region does not meet the specific condition.

The above are only a few examples of the first feature information, and the first feature information is not limited in this embodiment.

In the above embodiments, the specified prediction mode may be one or more of ordinary intra prediction modes. The ordinary intra prediction mode includes a DC mode; or, the ordinary intra prediction mode includes a DC mode, a horizontal prediction mode, and a vertical prediction mode; or, the ordinary intra prediction mode includes a DC mode and an angle prediction mode; or, the ordinary intra prediction mode includes a DC mode, an angle prediction mode, and a Planar mode; or, the ordinary intra prediction mode includes a DC mode, an angle prediction mode, and a bilinear mode; or, the ordinary intra prediction mode includes a DC mode, an angle prediction mode, a Planar mode, and a bilinear mode.

In a possible embodiment, an implicit method can be used to determine whether there is a need to adjust a reconstruction value of the current image region. For the convenience of distinction, feature information involved in the implicit method is named as feature information of a second type and further abbreviated as second feature information.

For example, the second feature information of the current image region can be obtained. If the second feature information of the current image region meets a specific condition (such as a second specific condition), it is determined there is a need to perform the reconstruction value adjustment on the current image region. If the second feature information of the current image region does not meet the specific condition, it is determined there is no need to perform the reconstruction value adjustment on the current image region.

For the specific implementation of the implicit method, please refer to the subsequent embodiments, which will not be described here.

At step 302, if it is determined to perform the reconstruction value adjustment on the current image region, an adjustment parameter for the current image region is acquired, where the adjustment parameter is for adjusting a reconstruction value of current image region.

At step 303, the adjustment parameter for the current image region is coded into a bit stream of the current image region.

For example, if the adjustment parameter for the current image region includes a plurality of adjustment values, all of the adjustment values or part of the adjustment values (i.e., part of the adjustment values among the plurality of adjustment values) may be coded in the bit stream of the current image region.

Coding part of or all the adjustment values in the bit stream of the current image region may include, but is not limited to, sorting a plurality of adjustment values according to a coding order of the plurality of adjustment values, and traversing the plurality of adjustment values in turn based on the sorting result. For the currently traversed adjustment value, if a current rate is less than a preset rate after coding the adjustment value in the bit stream of the current image region, the adjustment value is coded in the bit stream of the current image region, and the next adjustment value of the adjustment value is continuously traversed, i.e., the next adjustment value is taken as the currently traversed adjustment value. Otherwise, it is forbidden to code the adjustment value in the bit stream of the current image region and stop traversing the next adjustment value of the adjustment value.

For example, the current image region may correspond to a plurality of pixel groups, and the adjustment parameter for the current image region may include a plurality of adjustment values. And the plurality of adjustment values may include adjustment values for K pixel groups which may be part of or all the plurality of pixel groups (i.e., all pixel groups in the current image region).

On this basis, M adjustment values for K pixel groups can be coded in the bit stream of the current image region, where M can be a positive integer, M can be less than or equal to K, and the M adjustment values can be determined based on the adjustment values for K pixel groups. And, adjustment value grouping indication information can also be coded in the bit stream of the current image region, and the adjustment value grouping indication information indicates a matching relationship between M adjustment values and K pixel groups.

For example, if K pixel groups correspond to the same adjustment value, the adjustment value grouping indication information may be a fourth value, which indicates that K pixel groups correspond to the same adjustment value. If K pixel groups correspond to K adjustment values, the adjustment value grouping indication information can be a fifth value, and the fifth value can indicate that K pixel groups correspond to K adjustment values.

For example, if the K pixel groups are part of the plurality of pixel groups, the coder can further code the pixel group indication information corresponding to the K pixel groups in the bit stream of the current image region, indicating that the bit stream of the current image region carries the adjustment values of the pixel groups corresponding to the pixel group indication information. If the K pixel groups are all pixel groups in the plurality of pixel groups, the coder may not code the pixel group indication information corresponding to the pixel groups in the bit stream of the current image region, which means that the bit stream of the current image region carries the adjustment values of all pixel groups. At this time, it is not necessary to code the pixel group indication information corresponding to the pixel groups in the bit stream. If the K pixel groups are part of the plurality of pixel groups, the pixel group indication information is used to distinguish pixel groups of a target category among pixel groups of all categories, that is, to distinguish K pixel groups from all the pixel groups.

For example, when the current image region corresponds to a plurality of channels, for each pixel group, an adjustment value for the pixel group may include an adjustment value for a plurality of channels or a single channel corresponding to the pixel group, and the plurality of channels or the single channel may include at least one of the following channels: a Y-channel, a U-channel, a V-channel, a Co-channel, a Cg-channel, an R-channel, a G-channel, a B-channel, an alpha-channel, an IR-channel, a D-channel, or a W-channel. For example, the plurality of channels include Y channel, U channel and V channel, or the plurality of channels include R channel, G channel and B channel, or the plurality of channels include R channel, G channel, B channel and alpha channel, or the plurality of channels include R channel, G channel, B channel and IR channel, or the plurality of channels include R channel, G channel, B channel and W channel, or the plurality of channels include R channel, G channel, B channel, IR channel and W channel, or the plurality of channels include R channel, G channel, B channel and D channel, or the plurality of channels can include R channel, G channel, B channel, D channel and W channel. In addition to an RGB color sensing channel, there may also be an IR channel (infrared or near infrared sensing channel), D channel (dark light channel, mainly through infrared or near infrared light), W channel (panchromatic sensing channel), and there are different channels for different sensors, for example, a sensor type can be RGB sensor, RGBIR sensor, RGBW sensor, RGBIRW sensor, RGBD sensor, RGBDW sensor, etc.

For example, the current image region corresponds to a plurality of pixel groups, which may include but not limited to the following ways: determining the plurality of pixel groups corresponding to the current image region according to pre-adjustment reconstruction values of each pixel point; or, a classification value of a pixel point is determined based on the pre-adjustment reconstruction values of surrounding pixels of the pixel point, and the plurality of pixel groups corresponding to the current image region are determined according to classification values of each pixel point; or, determining the plurality of pixel groups corresponding to the current image region according to a pixel position of each pixel point; or, determining the plurality of pixel groups corresponding to the current image region according to a prediction mode of the current image region; or, determining the plurality of pixel groups corresponding to the current image region according to a scanning order of the current image region. The above manner is only illustrative and will not be limited herein.

When determining the plurality of pixel groups corresponding to the current image region according to the prediction mode of the current image region, firstly, a number of partitions, a filtering region, and a partition manner for partitioning pixel groups can be determined according to the prediction mode of the current image region; and then, the plurality of pixel groups corresponding to the current image region can be determined based on the number of partitions, the filtering region and the partition manner.

For example, if the prediction mode of the current image region is a horizontal prediction mode, it is determined that the number of partitions of the pixel group is a first number of partitions, the filtering region of the pixel group is a first filtering region, and the partition manner is a first size specification. If the prediction mode of the current image region is a non-horizontal prediction mode, it is determined that the number of partitions of the pixel group is a second number of partitions, the filtering region of the pixel group is a second filtering region, and the partition manner is a second size specification.

For example, if the current image region is an image block of 16*2 (i.e., one image block), when partitioning a plurality of pixel groups according to the prediction mode, if the prediction mode of the current image region is a horizontal prediction mode, all pixel points in the current image region are partitioned into four pixel groups, and each pixel group is of a size 8*1; or, all pixels of the current image region are partitioned into two pixel groups, and each pixel group is of a size 16*1. If the prediction mode of the current image region is a non-horizontal prediction mode, all the pixel points in the current image region are partitioned into four pixel groups, where each pixel group is of a size 4*2.

For example, if the current image region is a 16*2 image block, all the pixel points in the current image region can be directly partitioned into four pixel groups, each of the four pixel groups is of a size 4*2, regardless of the prediction mode of the current image region.

In the above embodiment, a value range of the adjustment value can be determined based on the quantization step.

For example, the above execution order is only for the convenience of describing the given example. In practical application, the execution order between steps can also be changed, and there is no restriction on this execution order. Moreover, in other embodiments, the steps of the corresponding method are not necessarily executed in the order shown and described in the present disclosure, and the method may include more or less steps than those described in the present disclosure. In addition, a single step described in the present disclosure may be decomposed into multiple steps for description in other embodiments. The steps described in the present disclosure may be combined into a single step in other embodiments.

As can be seen from the above technical solutions, a lightweighted compression method is proposed in the embodiment of the present disclosure, which can be applied to scenes with high real-time requirements, small cache and high parallelism requirements. After a reconstruction value of a current image region is obtained, the reconstruction value of the current image region can also be adjusted, so that a reconstructed pixel can be closer to an original pixel, and the coding performance and decoding performance can be improved. For a large quantization step, reducing quantization error method flat regions, reducing the color block problem caused by overall deviation can reduce subjective loss, i.e., lightweighted compression method can achieve subjective loss and hardware implementation is simple.

Embodiment 2: A decoding method is proposed in an embodiment of the present disclosure, as shown in FIG. 4, which is a schematic flowchart of the decoding method. The method can be performed by a decoding side (also named as a video decoder), and may include:

at step 401, determine, based on feature information of a current image region, whether to perform a reconstruction value adjustment on current image region.

In a possible embodiment, an explicit method can be used to determine whether there is a need to adjust a reconstruction value of the current image region. For the convenience of distinction, feature information involved in the explicit method is named as first feature information.

For example, the first feature information of the current image region can be obtained. If the first feature information of the current image region meets a specific condition (such as a first specific condition), a flag bit corresponding to an adjustment control switch can be obtained from a bit stream of the current image region, and based on the flag bit, a determination can be made on whether to perform a reconstruction value adjustment on the current image region. If the flag bit is a first value, it can be determined that there is a need to perform the reconstruction value adjustment on the current image region. If the flag bit is a second value, it can be determined that there is no need to perform the reconstruction value adjustment on the current image region. Or, if the first feature information of the current image region does not meet the first specific condition, it can be directly determined that there is no need to perform the reconstruction value adjustment on the current image region, and it is not necessary to obtain the flag bit corresponding to the adjustment control switch in the bit stream of the current image region.

For example, the current image region may include one image block, or the current image region may include a plurality of consecutive image blocks. The bit stream of the current image region means: a bit stream related to the current image region, i.e., there is information in the bit stream for processing the current image region, for which there is no restriction on the bit stream of the current image region.

For example, the first feature information of the current image region may include but not limited to at least one of the following: a prediction mode, data amount in a bit stream buffer or a quantization step. Based on this, if the first feature information includes the prediction mode, determining that the prediction mode meets the specific condition when the prediction mode corresponding to the current image region is a specified prediction mode, otherwise, determining that the prediction mode does not meet the specific condition. If the first feature information includes the data amount in the bit stream buffer, determining that the data amount in the bit stream buffer meets the specific condition when the data amount in the bit stream buffer is within a preset data amount interval, otherwise, determining that the data amount in the bit stream buffer does not meet the specific condition. If the first feature information includes the quantization step, determining that the quantization step meets the specific condition when the quantization step corresponding to the current image region is within a preset step interval, otherwise, determining that the quantization step does not meet the specific condition.

In the above embodiments, the specified prediction mode may be one or more of ordinary intra prediction modes, where: the ordinary intra prediction mode includes a DC mode; or, the ordinary intra prediction mode includes a DC mode, a horizontal prediction mode, and a vertical prediction mode; or, the ordinary intra prediction mode includes a DC mode and an angle prediction mode; or, the ordinary intra prediction mode includes a DC mode, an angle prediction mode, and a Planar mode; or, the ordinary intra prediction mode includes a DC mode, an angle prediction mode, and a bilinear mode; or, the ordinary intra prediction mode includes a DC mode, an angle prediction mode, a Planar mode, and a bilinear mode.

In a possible embodiment, an implicit method can be used to determine whether there is a need to adjust a reconstruction value of the current image region. For the convenience of distinction, feature information involved in the implicit method is named as second feature information.

For example, the second feature information of the current image region can be obtained. If the second feature information of the current image region meets a specific condition (such as a second specific condition), it is determined there is a need to perform the reconstruction value adjustment on the current image region. If the second feature information of the current image region does not meet the specific condition, it is determined there is no need to perform the reconstruction value adjustment on the current image region.

For the specific implementation of the implicit method, please refer to the subsequent embodiments, which will not be described here.

At step 402, if it is determined to perform the reconstruction value adjustment on the current image region, an adjustment parameter for the current image region is acquired from a bit stream of the current image region, where the adjustment parameter is for adjusting a reconstruction value.

At steps 403, a reconstruction value of the current image region is adjusted based on the adjustment parameter.

In a possible implementation, the adjustment parameter for the current image region may include a plurality of adjustment values, the current image region may correspond to a plurality of pixel groups, the plurality of adjustment values may include adjustment values for K pixel groups which may be part of or all the plurality of pixel groups. On this basis, adjusting the reconstruction value of the current image region based on the adjustment parameter may include, but is not limited to, adjusting reconstruction values of pixel points in K pixel groups based on a plurality of adjustment values. For example, K may be a positive integer greater than or equal to 1. Adjusting the reconstruction values of points in K pixel groups based on the plurality of adjustment values may include, but is not limited to, the following ways: for each pixel group in the K pixel groups, if the plurality of adjustment values include an adjustment value for the pixel group, adjusting a reconstruction value of each pixel point in the pixel group based on the adjustment value for the pixel group, so as to obtain an adjusted reconstruction value of each pixel point in the pixel group.

For example, if the K pixel groups are part of the plurality of pixel groups, the decoding side can further obtain pixel group indication information corresponding to the K pixel groups from the bit stream of the current image region, select K pixel groups from all pixel groups based on the pixel group indication information, and a plurality of adjustment values are associated with the K pixel groups, so that reconstruction values of the pixel points in the K pixel groups can be adjusted based on the plurality of adjustment values, i.e., only the reconstruction values of the pixel points in the K pixel groups can be adjusted.

If the K pixel groups are part of the plurality of pixel groups, the pixel group indication information is used to distinguish pixel groups of a target category among pixel groups of all categories, that is, to distinguish K pixel groups from all the pixel groups.

For each pixel group, an adjustment value for the pixel group may include an adjustment value for a plurality of channels corresponding to the pixel group, and the plurality of channels may include at least one of the following channels: a Y-channel, a U-channel, a V-channel, an R-channel, a G-channel, a B-channel, an alpha-channel, an IR-channel, a D-channel, or a W-channel. For example, the plurality of channels include Y channel, U channel and V channel, or the plurality of channels include R channel, G channel and B channel, or the plurality of channels include R channel, G channel, B channel and alpha channel, or the plurality of channels include R channel, G channel, B channel and IR channel, or the plurality of channels can include R channel, G channel, B channel and W channel, or the plurality of channels can include R channel, G channel, B channel, IR channel and W channel, or the plurality of channels can include R channel, G channel, B channel and D channel, or the plurality of channels can include R channel, G channel, B channel, D channel and W channel.

For example, the adjustment value grouping indication information can further be obtained from the bit stream of the current image region, and the adjustment value grouping indication information indicates a mapping relationship between adjustment values and the K pixel groups. M adjustment values are parsed from the bit stream of the current image region based on the adjustment value grouping indication information, where M is a positive integer and M is less than or equal to K; and the adjustment values for the K pixel groups may be determined based on the M adjustment values. For example, if the adjustment value grouping indication information is a fourth value, then M is 1, in which case the decoding side may determine that K pixel groups correspond to one adjustment value; if the adjustment value grouping indication information is a fifth value, then M is K, in which case the decoding side may determine that K pixel groups correspond to K adjustment values.

For example, in the case where the current image region corresponds to a plurality of channels, parsing the M adjustment values from the bit stream of the current image region may include: for each of the channels, parsing, from the bit stream of the current image region, one or more adjustment values for the channel.

For example, the current image region corresponds to a plurality of pixel groups, which may include but not limited to: determining the plurality of pixel groups corresponding to the current image region according to pre-adjustment reconstruction values of each pixel point; or, a classification value of a pixel point is determined based on the pre-adjustment reconstruction values of surrounding pixels of the pixel point, and the plurality of pixel groups corresponding to the current image region are determined according to classification values of each pixel point; or, determining the plurality of pixel groups corresponding to the current image region according to a pixel position of each pixel point; or, determining the plurality of pixel groups corresponding to the current image region according to a prediction mode of the current image region; or, determining the plurality of pixel groups corresponding to the current image region according to a scanning order of the current image region. The above manner is only illustrative and will not be limited herein.

When determining the plurality of pixel groups corresponding to the current image region according to the prediction mode of the current image region, firstly, a number of partitions, a filtering region, and a partition manner for partitioning pixel groups can be determined according to the prediction mode of the current image region, and then, the plurality of pixel groups corresponding to the current image region can be determined based on the number of partitions, the filtering region and the partition manner.

For example, determining the plurality of pixel groups corresponding to the current image region based on the number of partitions, the filtering region and the partition manner may include: if the prediction mode of the current image region is a horizontal prediction mode, it is determined that the number of partitions of the pixel group is a first number of partitions, the filtering region of the pixel group is a first filtering region, and the partition manner is a first size specification. If the prediction mode of the current image region is a non-horizontal prediction mode, it is determined that the number of partitions of the pixel group is a second number of partitions, the filtering region of the pixel group is a second filtering region, and the partition manner is a second size specification.

For example, if the current image region is an image block of 16*2 (i.e., one image block), when partitioning a plurality of pixel groups according to the prediction mode, if the prediction mode of the current image region is a horizontal prediction mode, all pixel points in the current image region are partitioned into four pixel groups, and each pixel group is of a size 8*1; or, all pixels of the current image region are partitioned into two pixel groups, and each pixel group is of a size 16*1. If the prediction mode of the current image region is a non-horizontal prediction mode, all the pixel points in the current image region are partitioned into four pixel groups, where each pixel group is of a size 4*2.

For example, if the current image region is a 16*2 image block, all the pixel points in the current image region can be directly partitioned into four pixel groups, each of the four pixel groups is of a size 4*2, regardless of the prediction mode of the current image region.

In the above embodiment, a value range of the adjustment value can be determined based on the quantization step.

As can be seen from the above technical solutions, a lightweighted compression method is proposed in the embodiment of the present disclosure, which can be applied to scenes with high real-time requirements, small cache and high parallelism requirements. After a reconstruction value of a current image region is obtained, the reconstruction value of the current image region can also be adjusted, so that a reconstructed pixel can be closer to an original pixel, and the coding performance and decoding performance can be improved. For a large quantization step, reducing quantization error method flat regions, reducing the color block problem caused by overall deviation can reduce subjective loss, i.e., lightweighted compression method can achieve subjective loss and hardware implementation is simple.

Embodiment 3: For Embodiment 1 and Embodiment 2, it can be determined whether to perform a reconstruction value adjustment on the current image region. For example, for the coding side, after coding the bit stream of N coding blocks (N≥1), the coding side can record P coding blocks (PEN) among N coding blocks as a current image region, and can determine whether to perform a reconstruction value adjustment on the current image region. For the decoding side, after decoding the bit stream of N decoding blocks (N≥1), the decoding side can record P decoding blocks among N coding blocks (corresponding to P coding blocks at the coding side) as a current image region, and can determine whether to perform a reconstruction value adjustment on the current image region.

For example, it can also be determined to perform a prediction value adjustment on the current image region, i.e., a prediction value of the current image region can be adjusted based on the adjustment parameter for the current image region, and the process of adjusting the prediction value is similar to that of adjusting the reconstruction value, which will not be described in detail in this embodiment. For example, it can also be determined whether to perform a residual value adjustment on the current image region, i.e., a residual value of the current image region can be adjusted based on the adjustment parameter for the current image region, and the process of adjusting the residual value is similar to that of adjusting the reconstruction value, which will not be described in detail in this embodiment.

For example, in order to determine to perform a reconstruction value adjustment on the current image region, the following manners can be adopted.

Explicit syntax manner: the coding side codes the flag bit corresponding to the adjustment control switch in the bit stream, and the decoding side parses the flag bit corresponding to the adjustment control switch from the bit stream, and determines whether to perform the reconstruction value adjustment on the current image region based on the flag bit.

The following describes an implementation process of explicit syntax manner in combination with specific application scenarios, which may include the following steps.

At step S11, the coding side determines whether first feature information of a current image region meets a first specific condition.

If not, step S12 can be executed, and if yes, step S13 can be executed.

For example, the first feature information of the current image region may include but not limited to at least one of the following: a prediction mode, data amount in a bit stream buffer or a quantization step. The above are only a few examples of the first feature information, and there is no restriction on this. The following examples will be used to explain the prediction mode, the data amount in the bit stream buffer and the quantization step.

Case 1: The first feature information may include the prediction mode. When the prediction mode corresponding to the current image region is a specified prediction mode, it can be determined that the first feature information meets a first specific condition; otherwise, when the prediction mode corresponding to the current image region is not the specified prediction mode, it can be determined that the first feature information does not meet the first specific condition.

Case 2: The first feature information may include the data amount in the bit stream buffer. When the data amount in the bit stream buffer is within a preset data amount interval, it can be determined that the first feature information meets the first specific condition; otherwise, when the data amount in the bit stream buffer is not within the preset data amount interval, it can be determined that the first feature information does not meet the first specific condition.

For example, a preset data amount interval [a1, a2] can be configured in advance, where a1 represents a minimum data amount and a2 represents a maximum data amount, and both a1 and a2 can be configured according to experience, so there is no restriction.

If the data amount in the bit stream buffer is greater than or equal to a1, and the data amount in the bit stream buffer is less than or equal to a2, the data amount in the bit stream buffer is within the preset data amount interval. If the data amount in the bit stream buffer is less than a1, or if the data amount in the bit stream buffer is greater than a2, the data amount in the bit stream buffer is not within the preset data amount interval.

For example, if the data amount in the bit stream buffer is within the preset data amount interval, that is, the data amount in the bit stream buffer is less than or equal to a2, then when filtering the current image region (the coding process shown in FIG. 1 is the filtering process), an overflow will not be triggered after adding filtering parameters, i.e., the bit stream buffer will not exceed a buffer limit.

Case 3: The first feature information may include the quantization step. When the quantization step corresponding to the current image region is within a preset step interval, it can be determined that the first feature information meets a first specific condition; otherwise, when the quantization step corresponding to the current image region is not within the preset step interval, it can be determined that the first feature information does not meet the first specific condition.

For example, a preset step interval [b1, b2] can be configured in advance, where b1 represents a minimum step and b2 represents a maximum step, and both b1 and b2 can be configured according to experience, so there is no restriction. If the quantization step corresponding to the current image region is greater than or equal to b1 and less than or equal to b2, the quantization step corresponding to the current image region is within the preset step interval. If the quantization step corresponding to the current image region is less than b1, or if the quantization step corresponding to the current image region is greater than b2, the quantization step corresponding to the current image region is not within the preset step interval.

For example, in case 3, it is determined that the first feature information meets the first specific condition only when the quantization step meets a certain condition (i.e., falls within the preset step interval), and the preset step interval enables no adjustment to be made for quantization steps that do not affect subjectivity.

For example, when configuring a value of b1, b1 can be configured according to experience, which is not limited. For example, b1 can be determined according to an input bit width of the current image region, and the larger the input bit width of the current image region, the larger the value of b1. For example, the value of b1 can be 16 when the input bit width of the current image region is 8 bits, the value of b1 can be 24 when the input bit width of the current image region is 10 bits, and the value of b1 can be 32 when the input bit width of the current image region is 12 bits. The above is only an example of the relationship between the input bit width and the minimum step b1, and there is no restriction on this minimum step b1.

To sum up, for different input bit widths of the current image region, when the quantization parameter (QP) satisfies the following relationship, the quantization step is greater than or equal to b1, i.e., it meets the minimum value requirement of the preset step interval: for 8 bit, QP≥16; for 10 bit, QP≥24; and for 12 bit, QP≥32.

For example, when configuring a value of b2, b2 can be configured according to experience, which is not limited. For example, b2 can be an infinite value; b2 can also be a fixed value, such as 48, 60, 76, etc.

Case 4: The first feature information may include the prediction mode and the data amount in the bit stream buffer. When the prediction mode corresponding to the current image region is a specified prediction mode and the data amount in the bit stream buffer is within a preset data amount interval, it can be determined that the first feature information meets the first specific condition; otherwise, when the prediction mode corresponding to the current image region is not the specified prediction mode, and/or the data amount in the bit stream buffer is not within the preset data amount interval, it can be determined that the first feature information does not meet the first specific condition.

Case 5: The first feature information may include the prediction mode and the quantization step. When the prediction mode corresponding to the current image region is a specified prediction mode and the quantization step corresponding to the current image region is within a preset step interval, it can be determined that the first feature information meets a first specific condition; otherwise, when the prediction mode corresponding to the current image region is not the specified prediction mode, and/or the quantization step corresponding to the current image region is not within the preset step interval, it can be determined that the first feature information does not meet the first specific condition.

Case 6: The first feature information may include the quantization step and the data amount in the bit stream buffer. When the quantization step corresponding to the current image region is within a preset step interval and the data amount in the bit stream buffer is within a preset data amount interval, it can be determined that the first feature information meets the first specific condition; otherwise, when the quantization step corresponding to the current image region is not within the preset step interval, and/or the data amount in the bit stream buffer is not within the preset data amount interval, it can be determined that the first feature information does not meet the first specific condition.

Case 7: The first feature information may include the prediction mode, the data amount in the bit stream buffer and the quantization step. When the prediction mode corresponding to the current image region is a specified prediction mode, the data amount in the bit stream buffer is within a preset data amount interval and the quantization step corresponding to the current image region is within a preset step interval, it can be determined that the first feature information meets a first specific condition; otherwise, when the prediction mode corresponding to the current image region is not the specified prediction mode, and/or the data amount in the bit stream buffer is not within the preset data amount interval, and/or the quantization step corresponding to the current image region is not within the preset step interval, it can be determined that the first feature information does not meet the first specific condition, i.e., as long as one of them is not satisfied, it is determined that the first feature information does not meet the first specific condition.

The above cases are only a few examples of "determining whether first feature information of a current image region meets a first specific condition", and the determination process of "whether the first feature information meets the first specific condition" is not limited in this embodiment.

For the above Cases 1, 4, 5 and 7, in a possible implementation, the specified prediction mode may be one or more of ordinary intra prediction modes. In another possible embodiment, the specified prediction mode can further be a pixel-wise prediction mode. The ordinary intra prediction mode and pixel-wise prediction mode are only examples and are not limited to them.

For Case 5 and Case 7, for the preset step interval, the preset step interval can further be set based on a specified prediction mode, such as setting a minimum value of the preset step interval based on the specified prediction mode. For example, the ordinary intra prediction mode can correspond to a first minimum value of the preset step interval, that is, the value of b1 can be the first minimum value; the pixel-wise prediction mode can correspond to a second minimum value of the preset step interval, that is, the value of b1 can be the second minimum value. The first minimum value can be greater than the second minimum value, and the first minimum value can also be less than the second minimum value, which is not limited, as long as the minimum value of the preset step interval is related to the specified prediction mode.

The ordinary intra prediction modes may include a DC mode. Or, the ordinary intra prediction modes may include a DC mode, a horizontal prediction mode, and a vertical prediction mode. Or, the ordinary intra prediction modes may include a DC mode and an angle prediction mode (such as a horizontal prediction mode, a vertical prediction mode and other angle prediction modes). Or, the ordinary intra prediction modes may include a DC mode, an angle prediction mode and a Planar mode. Or, the ordinary intra prediction modes may include a DC mode, an angle prediction mode and a bilinear mode. Or, the ordinary intra prediction modes may include a DC mode, an angle prediction mode, a Planar mode and a bilinear mode. The above is just an example of ordinary intra prediction modes, and there is no limitation on this. On the basis of each of the above ordinary intra prediction modes, other types of intra prediction modes can also be used as ordinary intra prediction modes.

At step S12, if the first feature information does not meet the first specific condition, the coding side determines that there is no need to perform the reconstruction value adjustment on the current image region, and does not code the flag bit corresponding to the adjustment control switch in the bit stream of the current image region.

At step S13, if the first feature information of the current image region meets the first specific condition, the coding side determines whether to perform the reconstruction value adjustment on the current image region, and codes the flag bit corresponding to the adjustment control switch in the bit stream of the current image region.

For example, if the first feature information meets the first specific condition, the coding side can determine whether to perform the reconstruction value adjustment on the current image region, and there is no restriction on this determination method. For example, the coding side calculates a cost value of starting the reconstruction value adjustment of the current image region, recorded as a first cost value, and calculates a cost value of turning off the reconstruction value adjustment of the current image region, recorded as a second cost value. On this basis, if the first cost value is less than the second cost value, the coding side determines that there is a need to perform the reconstruction value adjustment on the current image region; otherwise, the coder determines that there is no need to perform the reconstruction value adjustment on the current image region.

For example, after the coding side determines whether to perform the reconstruction value adjustment on the current image region, it can code the flag bit corresponding to the adjustment control switch in the bit stream of the current image region. For example, if it is determined that there is a need to perform the reconstruction value adjustment on the current image region, the flag bit can be the first value, and the first value indicates that there is a need to perform the reconstruction value adjustment on the current image region. If it is determined that there is no need to perform the reconstruction value adjustment on the current image region, the flag bit can be the second value, and the second value indicates that there is no need to perform the reconstruction value adjustment on the current image region. Both the first value and the second value can be configured according to experience, such as the first value is 0 and the second value is 1, or the first value is 1 and the second value is 0.

At step S14: the decoding side determines whether the first feature information of the current image region meets the first specific condition.

If not, step S15 can be executed, and if yes, step S16 can be executed.

For example, the implementation process of step S14 is similar to that of step S11, which is not repeated here.

At step S15, if the first feature information does not meet the first specific condition, the decoding side determines that there is no need to perform the reconstruction value adjustment on the current image region, and there is no need to decode the flag bit corresponding to the adjustment control switch in the bit stream of the current image region.

At step S16, if the first feature information meets the first specific condition, the decoding side obtains a flag bit corresponding to an adjustment control switch from a bit stream of the current image region, and determines whether to perform the reconstruction value adjustment on the current image region based on the flag bit. If the flag bit is a first value, the decoding side can determine that there is a need to perform the reconstruction value adjustment on the current image region. If the flag bit is a second value, the decoding side can determine that there is no need to perform the reconstruction value adjustment on the current image region.

To sum up, both the coding side and decoding side can determine whether there is a need to perform the reconstruction value adjustment on the current image region, and a conclusion of this reconstruction value adjustment can be applied to the current image region. If there is a need to perform the reconstruction value adjustment on the current image region, for the coding side, reconstruction values of N coding blocks need to be adjusted, and for the decoding side, reconstruction values of N decoding blocks need to be adjusted. If it is not necessary to perform the reconstruction value adjustment on the current image region, for the coding side, it is not necessary to adjust the reconstruction values of N coding blocks, and for the decoding side, it is not necessary to adjust reconstruction values of N decoding blocks.

Embodiment 4: For Embodiment 1 and Embodiment 2, it can be determined whether to perform a reconstruction value adjustment on the current image region. For example, for the coding side, after coding the bit stream of N coding blocks (N≥1), the coding side can record N coding blocks as a current image region, and can determine whether to perform a reconstruction value adjustment on the current image region. For the decoding side, after decoding the bit stream of N decoding blocks (N≥1), the decoding side can record N decoding blocks (corresponding to N coding blocks at the coding side) as a current image region, and can determine whether to perform a reconstruction value adjustment on the current image region.

For example, in order to determine whether to perform a reconstruction value adjustment on the current image region, the following manners can be adopted.

Implicit export manner: the coding side can implicitly export whether to perform the reconstruction value adjustment on the current image region according to second feature information of the current image region, and the decoding side can also implicitly export whether to perform the reconstruction value adjustment on the current image region according to the second feature information of the current image region.

The following describes an implementation process of implicit export manner derived in combination with specific application scenarios, which may include the following steps.

At step S21, the coding side determines whether second feature information of a current image region meets a second specific condition.

If not, step S22 can be executed, and if yes, step S23 can be executed.

For example, the second feature information of the current image region may include, but is not limited to, at least one of upper and lower overflow indication information of a rate control, a quantization parameter, a reconstructed pixel feature, or a block position, and the upper and lower overflow indication information of the rate control may include, but is not limited to, a current rate, and the quantization parameter may include, but is not limited to, a quantization step. The current rate represents an average rate of all rate control units before the rate control unit where the current image region is located. The block position is a block position of an image block in the current image region, such as a block position of any image block in the current image region, and the block position indicates a position of the image block in a current frame. The current rate, quantization parameter, reconstructed pixel feature and block position are just a few examples of the second feature information, which is not limited. Whether the second feature information meets the second specific condition may include but not limited to:

Case I, the second feature information of the current image region may include the current rate corresponding to the current image region, the current rate is also rate control information, i.e., upper and lower overflow indication information of the rate control. If the current rate is less than a first rate value, it is determined that the second feature information meets the second specific condition, otherwise, it is determined that the second feature information does not meet the second specific condition.

For example, the first rate value can be a rate value configured according to experience, and there is no restriction on this first rate value. When the current rate is less than the first rate value, it can indicate that the rate control information indicates that a resource pool (for example, a bit stream buffer for storing a bit stream) is sufficient.

In a possible implementation, a target upper limit rate may be preconfigured, and when the current rate is close to the target upper limit rate, it indicates that the rate control information indicates that the resource pool is normal, when the current rate is greater than a sum of the target upper limit rate and a preset threshold, it indicates that the rate control information indicates that the resource pool is insufficient, and when the current rate is less than a difference between the target upper limit rate and the preset threshold, it indicates that the rate control information indicates that the resource pool is sufficient. On this basis, the difference between the target upper rate and the preset threshold can be taken as the first rate value.

Case II, the second feature information of the current image region may include the block position corresponding to the current image region. If the block position corresponding to the current image region is located at a specified position, it is determined that the second feature information meets the second specific condition; otherwise, if the block position corresponding to the current image region is not located at the specified position, it is determined that the second feature information does not meet the second specific condition.

For example, the specified position may be last L image blocks (L may be a positive integer greater than or equal to 1) of a current rate control unit (i.e., the rate control unit in which the current image region is located), or the specified position may be a bottom row of image blocks of the current rate control unit, etc. On this basis, if the block position belongs to the last L image blocks or the bottom row of image blocks of the current rate control unit, it is determined that the block position is located at the specified position, otherwise, it is determined that the block position is not located at the specified position.

For another example, the specified position may be a Slice boundary position within the current frame. If the block position belongs to the Slice boundary position within the current frame, it is determined that the block position is located at the specified position, otherwise, it is determined that the block position is not located at the specified position.

For another example, the specified position may be the last L image blocks of the current rate control unit and the Slice boundary position within the current frame, and if the block position belongs to the last L image blocks of the current rate control unit, or, if the block position belongs to the Slice boundary position within the current frame, it is determined that the block position is located at the specified position. If the block position does not belong to the last L image blocks of the current rate control unit and the block position does not belong to the Slice boundary position within the current frame, it is determined that the block position is not located at the specified position.

The above are only a few examples of the specified position, and there is no restriction on this specified position in this embodiment.

Case III, the second feature information of the current image region may include the quantization step corresponding to the current image region, and if the quantization step is greater than a step threshold, it is determined that the second feature information meets the second specific condition, otherwise, if the quantization step is not greater than the step threshold, it is determined that the second feature information does not meet the second specific condition.

Case IV, the second feature information of the current image region may include the current rate corresponding to the current image region and the block position corresponding to the current image region. On this basis, if the current rate is less than the first rate value and the block position is located at the specified position, it is determined that the second feature information meets the second specific condition, otherwise, it is determined that the second feature information does not meet the second specific condition.

Case V, the second feature information of the current image region may include the current rate corresponding to the current image region and the block position corresponding to the current image region, and if the current rate is less than the first rate value, or the block position is located at the specified position, it is determined that the second feature information meets the second specific condition, otherwise, it is determined that the second feature information does not meet the second specific condition.

Case VI, the second feature information of the current image region may include the current rate corresponding to the current image region and the quantization step corresponding to the current image region, and if the current rate is less than the first rate value and the quantization step length is greater than the step threshold, it is determined that the second feature information meets the second specific condition, otherwise, it is determined that the second feature information does not meet the second specific condition.

Case VII, the second feature information of the current image region may include the current rate corresponding to the current image region and the quantization step corresponding to the current image region. If the current rate is less than the first rate value, or the quantization step length is greater than the step threshold, it is determined that the second feature information meets the second specific condition, otherwise, it is determined that the second feature information does not meet the second specific condition.

Case VIII, the second feature information of the current image region may include the block position corresponding to the current image region and the quantization step corresponding to the current image region. On this basis, if the block position is located at the specified position and the quantization step is greater than the step threshold, it is determined that the second feature information meets the second specific condition, otherwise, it is determined that the second feature information does not meet the second specific condition.

Case IX, the second feature information of the current image region may include the block position corresponding to the current image region and the quantization step corresponding to the current image region. If the block position is located at the specified position, or the quantization step is greater than the step threshold, it is determined that the second feature information meets the second specific condition, otherwise, it is determined that the second feature information does not meet the second specific condition.

Case X, the second feature information of the current image region may include the current rate corresponding to the current image region, the block position corresponding to the current image region and the quantization step corresponding to the current image region. On this basis, if the current rate is less than the first rate value, the block position is located at the specified position and the quantization step is greater than the step threshold, it can be determined that the second feature information meets the second specific condition, otherwise, it can be determined that the second feature information does not meet the second specific condition.

Case XI, the second feature information of the current image region may include the current rate corresponding to the current image region, the block position corresponding to the current image region and the quantization step corresponding to the current image region. On this basis, if the current rate is less than the first rate value, or the block position is located at the specified position, or the quantization step is greater than the step threshold, it can be determined that the second feature information meets the second specific condition, otherwise, it can be determined that the second feature information does not meet the second specific condition.

Case XII, the second feature information of the current image region may include the reconstructed pixel feature corresponding to the current image region. On this basis, if the reconstructed pixel feature indicates that a complexity of the current image region is simple, it can be determined that the second feature information meets the second specific condition, otherwise, it can be determined that the second feature information does not meet the second specific condition.

For example, the reconstructed pixel feature may be, a complexity (e.g., a gradient) of the current image region computed from reconstructed pixels, such as the complexity of the current pixel region may be evaluated using a Sobel operator to obtain the complexity of the current image region; a transform may be performed on reconstructed pixel values of the current image region, and the complexity of the current image region may be obtained based on features of a transformed domain, such as a frequency domain; and horizontal and vertical gradients of the current image region may be computed, and the complexity of the current image region may be obtained based on the horizontal and vertical gradients. The above are just a few examples, as long as the reconstructed pixel features can be obtained, and the reconstructed pixel features can represent the complexity of the current image region.

The principle of reconstructed pixel features is similar to the principle of block position, which can often bear more losses in complex regions without being detected, but for simple regions, such as flat regions, small losses will be detected by human eyes.

Based on the above principle, when the reconstructed pixel features indicate that the complexity of the current image region is simple, it means that the reconstruction value of the current image region can be adjusted to reduce the image loss, so it can be determined that the second feature information meets the second specific condition. For example, the reconstructed pixel feature can be a complexity value. When the complexity value is greater than a preset threshold, the reconstructed pixel feature can indicate that the complexity of the current image region is complex, otherwise, the complexity of the current image region is simple. In the embodiment of the present disclosure, there is no restriction on the complexity of the current image region. For example, when the complexity value is less than the preset threshold, the reconstructed pixel feature can indicate that the complexity of the current image region is simple, otherwise, the complexity of the current image region is complex.

Case XIII, the second feature information of the current image region may include the reconstructed pixel feature corresponding to the current image region. On this basis, the second feature information of the current image region further includes at least one of the current rate, block position and quantization step. For convenience of description, taking the current rate, block position and quantization step size as an example, the implementation in other cases is similar. Based on this, if the current rate is less than the first rate value, the block position is located at the specified position and the quantization step is greater than the step threshold, and the reconstructed pixel feature indicates that the complexity of the current image region is simple, it can be determined that the second feature information meets the second specific condition, otherwise, it can be determined that the second feature information does not meet the second specific condition.

Case XIV, the second feature information of the current image region includes the reconstructed pixel feature corresponding to the current image region. On this basis, the second feature information of the current image region further includes at least one of the current rate, block position and quantization step. For convenience of description, taking the current rate, block position and quantization step size as an example, the implementation in other cases is similar. Based on this, if the current rate is less than the first rate value, or the block position is located at the specified position, or the quantization step is greater than the step threshold, or the reconstructed pixel feature indicates that the complexity of the current image region is simple, it can be determined that the second feature information meets the second specific condition, otherwise, it can be determined that the second feature information does not meet the second specific condition.

The above cases are only a few examples of "determining whether second feature information of a current image region meets a second specific condition", and the determination process of "whether the second feature information meets the second specific condition" is not limited in this embodiment.

At step S22: the coding side determines that there is no need to perform the reconstruction value adjustment on current image region.

At step S23, the coding side determines that there is a need to perform the reconstruction value adjustment on current image region.

At step S24, the decoding side determines whether the second feature information of the current image region meets the second specific condition.

If not, step S25 can be executed, and if yes, step S26 can be executed.

For example, the implementation process of step S24 is similar to that of step S21, which is not repeated here.

At step S25: the decoding side determines that there is no need to perform the reconstruction value adjustment on current image region.

At step S26, the decoding side determines that there is a need to perform the reconstruction value adjustment on current image region.

Embodiment 5: For Embodiment 1 and Embodiment 2, it can be determined whether to perform a reconstruction value adjustment on the current image region. For example, for the coding side, after coding the bit stream of N coding blocks (N≥1), the coding side can record N coding blocks as a current image region, and can determine whether to perform a reconstruction value adjustment on the current image region. For the decoding side, after decoding the bit stream of N decoding blocks (N≥1), the decoding side can record N decoding blocks (corresponding to N coding blocks at the coding side) as a current image region, and can determine whether to perform a reconstruction value adjustment on the current image region.

For example, in order to determine whether to perform a reconstruction value adjustment on the current image region, the following manners can be adopted.

Combination implementation manner, which combines explicit syntax and implicit export. For example, after the coding side obtains the flag bit of the adjustment control switch corresponding to the current image region (see Embodiment 3), if the flag bit of the adjustment control switch is the same as that of the adjustment control switch corresponding to the target image region (such as a previous image region of the current image region, a specified image region, or a default image region, etc.), the coding side may not code the flag bit of the adjustment control switch in the bit stream of the current image region. When the decoding side knows that the bit stream of the current image region does not carry the flag bit of the adjustment control switch, it can take a flag bit of an adjustment control switch corresponding to a target image region as the flag bit of the adjustment control switch corresponding to the current image region, and then determine whether to perform a reconstruction value adjustment on the current image region. Or, after the coding side obtains the flag bit of the adjustment control switch corresponding to the current image region, if the flag bit of the adjustment control switch is different from that of the adjustment control switch corresponding to the target image region, the coding side can code the flag bit of the adjustment control switch in the bit stream of the current image region. The decoding side can parse the flag bit of the adjustment control switch corresponding to the current image region from the bit stream, and determine whether to perform the reconstruction value adjustment on the current image region based on the flag bit.

Embodiment 6: For Embodiment 1 to Embodiment 5, after determining whether to perform reconstruction value adjustment on the current image region, if it is determined to perform reconstruction value adjustment on the current image region, an adjustment parameter for the current image region can be obtained. This adjustment parameter can be used to adjust reconstruction values of the current image region, i.e., to adjust reconstruction values (or predicted values, or residual values, etc.) of N image blocks in the current image region. For example, for the coding side, the current image region can include N coded blocks, and the adjustment parameter can be used to adjust reconstruction values of the N coded blocks; for the decoding side, the current image region can include N decoded blocks, and the adjustment parameter can be used to adjust reconstruction values of the N decoded blocks.

For the coding side, an adjustment parameter for the current image region can be determined based on an original value and a reconstruction value of the current image region. The adjustment parameter is used to adjust the reconstruction value of the current image region so that an adjusted reconstruction value is close to the original value of the current image region, and the present embodiment does not limit the process of obtaining the adjustment parameter.

For example, the adjustment parameter for the current image region may include a plurality of adjustment values, the current image region may correspond to a plurality of pixel groups, i.e., all pixel points in the current image region may be partitioned into a plurality of pixel groups, and on this basis, the plurality of adjustment values may include adjustment values for K pixel groups which may be part of or all the plurality of pixel groups. For example, all pixel points in the current image region can be partitioned into 32 pixel groups, and K pixel groups can be selected from the 32 pixel groups, such as 4 pixel groups, 8 pixel groups, 16 pixel groups, 32 pixel groups, etc. The value of K is not limited. Based on this, the coding side obtains the adjustment parameter for the K pixel groups, i.e., the adjustment parameter can include adjustment values for the K pixel groups, and an adjustment value for each pixel group is used to adjust a reconstruction value of each pixel point in the pixel group. For example, assuming that the K pixel groups are pixel group 1 and pixel group 2, the coding side can obtain an adjustment value for pixel group 1 and an adjustment value for pixel group 2. The adjustment value for pixel group 1 is used to adjust a reconstruction value for each pixel point within pixel group 1, and the adjustment value for pixel group 2 is used to adjust a reconstruction value for each pixel point within pixel group 2.

For each pixel group, the adjustment value for the pixel group may include adjustment values for a plurality of channels or a single channel corresponding to the pixel group. For example, the plurality of channels can include Y channel, U channel and V channel, or the plurality of channels can include R channel, G channel and B channel, or the plurality of channels can include R channel, G channel, B channel and alpha channel, or the plurality of channels can include R channel, G channel, B channel and IR channel, or the plurality of channels can include R channel, G channel, B channel and W channel, or the plurality of channels can include R channel, G channel, B channel, IR channel and W channel, or the plurality of channels can include R channel, G channel, B channel and D channel, or the plurality of channels can include R channel, G channel, B channel, D channel and W channel. The single channel can be any of the above channels. The above are just a few examples.

In practical application, two or more of the above channels can also use the same adjustment value, for example, the U channel and the V channel can use the same adjustment value, or the R channel and the G channel can use the same adjustment value, which is not limited.

For example, adjustment values for pixel group 1 include Y-channel adjustment value 1, U-channel adjustment value 1 and V-channel adjustment value 1. Y-channel adjustment value 1 is used to adjust an Y-channel reconstruction value of each pixel point in pixel group 1, U-channel adjustment value 1 is used to adjust a U-channel reconstruction value of each pixel point in pixel group 1, and V-channel adjustment value 1 is used to adjust a V-channel reconstruction value of each pixel point in pixel group 1. Adjustment values for pixel group 2 include Y-channel adjustment value 2, U-channel adjustment value 2 and V-channel adjustment value 2. Y-channel adjustment value 2 is used to adjust an Y-channel reconstruction value of each pixel point in pixel group 2, U-channel adjustment value 2 is used to adjust a U-channel reconstruction value of each pixel point in pixel group 2, and V-channel adjustment value 2 is used to adjust a V-channel reconstruction value of each pixel point in pixel group 2. In the case where a pixel group corresponds to a plurality of channels, adjustment values of each channel corresponding to the pixel group may all be different, may all be the same, or may be partially the same and partially different.

For example, after the coding side obtains the adjustment parameter for the current image region, it can further code the adjustment parameter for the current image region into a bit stream of the current image region. For example, the adjustment parameter can include adjustment values for K pixel groups, so the adjustment values for K pixel groups can be coded in the bit stream of the current image region.

For the decoding side, the adjustment parameter for the current image region can be obtained from the bit stream of the current image region, and the adjustment parameter is used to adjust the reconstruction value of the current image region so that the adjusted reconstruction value is close to the original value of the current image region. After the adjustment parameter is acquired, the reconstruction value of the current image region can be adjusted based on the adjustment parameter.

For example, the adjustment parameter for the current image region may include a plurality of adjustment values, and all pixel points in the current image region may be partitioned into a plurality of pixel groups, and on this basis, the plurality of adjustment values may include adjustment values for K pixel groups which may be part of or all the plurality of pixel groups. The decoding side can obtain an adjustment parameter for K pixel groups from the bit stream, that is, the adjustment parameter can include adjustment values for K pixel groups. The decoding side can adjust a reconstruction value of each pixel point in the pixel group based on an adjustment value for the pixel group. For example, assuming that the K pixel groups are pixel group 1 and pixel group 2, the decoding side can obtain an adjustment value for pixel group 1 and an adjustment value for pixel group 2, adjust a reconstruction value of each pixel point in pixel group 1 based on the adjustment value for pixel group 1, and adjust the reconstruction value of each pixel point in pixel group 2 based on the adjustment value for pixel group 2.

For each pixel group, the adjustment value for the pixel group may include the adjustment values of a plurality of channels or a single channel corresponding to the pixel group, for example, the plurality of channels can include Y channel, U channel and V channel, or the plurality of channels can include R channel, G channel and B channel, or the plurality of channels can include R channel, G channel, B channel and alpha channel, or the plurality of channels can include R channel, G channel, B channel and IR channel, or the plurality of channels can include R channel, G channel, B channel and W channel, or the plurality of channels can include R channel, G channel, B channel, IR channel and W channel, or the plurality of channels can include R channel, G channel, B channel and D channel, or the plurality of channels can include R channel, G channel, B channel, D channel and W channel. The single channel can be any of the above channels. The above are only examples and no limitations are made herein.

For example, taking an adjustment value for a pixel group including adjustment values for a plurality of channels corresponding to the pixel group as an example, for each of the K pixel groups, if the plurality of adjustment values obtained from the bit stream include the adjustment value for the pixel group, the decoding side adjusts a reconstruction value of each pixel point within the pixel group based on the adjustment value for the pixel group, to obtain an adjusted reconstruction value for each pixel point within that pixel group. For example, if the plurality of adjustment values obtained from the bit stream include Y-channel adjustment value 1, U-channel adjustment value 1 and V-channel adjustment value 1 corresponding to pixel group 1, an Y-channel reconstruction value of each pixel point in pixel group 1 can be adjusted based on the Y-channel adjustment value 1, a U-channel reconstruction value of each pixel point in pixel group 1 can be adjusted based on the U-channel adjustment value 1, and a V-channel reconstruction value of each pixel point in pixel group 1 can be adjusted based on the V-channel adjustment value 1. For another example, if the plurality of adjustment values obtained from the bit stream includes only the Y-channel adjustment value 1 corresponding to the pixel group 1 and does not include the U-channel adjustment value 1 and the V-channel adjustment value 1 corresponding to the pixel group 1, the decoding side may adjust the Y-channel reconstruction value for each pixel point within the pixel group 1 based on the Y-channel adjustment value 1.

In a possible implementation, if the K pixel groups are all the pixel groups in a plurality of pixel groups (e.g., 32 pixel groups), the coding side may not code pixel group indication information corresponding to the K pixel groups in the bit stream of the current image region, and the decoding side does not need to parse the pixel group indication information corresponding to the K pixel groups from the bit stream of the current image region, and on this basis, the decoding side may be informed that adjustment parameter carried in the bit stream is adjusted values of all the pixel groups (e.g., 32 pixel groups).

If the K pixel groups are part of all the pixel groups, the coding side may code pixel group indication information corresponding to the K pixel groups in the bit stream of the current image region, indicating that the bit stream carries adjusted values of the K pixel groups corresponding to the pixel group indication information. The decoding side may parse the pixel group indication information corresponding to the K pixel groups from the bit stream of the current image region, and be informed that the adjustment parameter carried in the bit stream are the adjustment values of the K pixel groups corresponding to the pixel group indication information.

For example, the pixel group indication information includes index values for K pixel groups, where each index value indicates a position of a pixel group among all pixel groups. Taking an example where the K pixel groups include pixel group 1, pixel group 2, pixel group 3, and pixel group 4, the pixel group indication information can include an index value for pixel group 1 (indicating its position among all pixel groups), an index value for pixel group 2, an index value for pixel group 3, and an index value for pixel group 4. If the K pixel groups are part of the plurality of pixel groups, the pixel group indication information is used to distinguish pixel groups of a target category among pixel groups of all categories, i.e., to distinguish the K pixel groups from all the pixel groups, and the pixel group indication information is capable of realizing a classification function.

For another example, assuming the K pixel groups are consecutive, the pixel group indication information can include index values of part of the K pixel groups, while index values of the remaining pixel groups can be implicitly derived. Taking an example where the K pixel groups include pixel group 1, pixel group 2, pixel group 3, and pixel group 4, the pixel group indication information can include only an index value of pixel group 1. Since the K pixel groups are consecutive, index values of pixel group 2, pixel group 3, and pixel group 4 can be implicitly derived.

In summary, the index values of the K pixel groups can be indicated explicitly, or, the index values of part of the K pixel groups can be indicated explicitly while the index values of the remaining pixel groups are implicitly derived. This embodiment does not limit the method as long as the decoding side can obtain the index values of the K pixel groups.

For example, if the K pixel groups are part of all pixel groups and are located at default positions, such as the K pixel groups are fixed to the first four pixel groups, or the K pixel groups are fixed to the first, third, fifth and seventh pixel groups, or the K pixel groups are fixed to the last four pixel groups, the coding side may not code the pixel group indication information corresponding to these K pixel groups in the bit stream of the current image region. Similarly, the decoding side does not need to parse the pixel group indication information corresponding to these K pixel groups from the bit stream of the current image region. On this basis, the decoding side recognizes that the adjustment parameter carried in the bit stream are adjustment values for the K pixel groups at the default positions. For instance, the adjustment parameter includes the adjustment values for the first four pixel groups, or for the 1st, 3rd, 5th, and 7th pixel groups, or for the last four pixel groups.

Embodiment 7: For the coding side, an adjustment parameter for the current image region include adjustment values for K pixel groups. The adjustment parameter can include a plurality of adjustment values. When the adjustment values for K pixel groups are coded in the bit stream of the current image region, part of or all the adjustment values can be coded in the bit stream of the current image region. For example, taking the adjustment value for a pixel group as including an adjustment value for a single channel of that pixel group, assuming that K pixel groups are 12 pixel groups, where adjustment values of 4 pixel groups are Y-channel adjustment values, 4 pixel groups are U-channel adjustment values and 4 pixel groups are V-channel adjustment values, the adjustment parameter for the current image region can include 12 adjustment values. The 12 adjustment values can be coded in the bit stream of the current image region, or some of the 12 adjustment values can be coded in the bit stream of the current image region.

For the decoding side, when obtaining the adjustment parameter from the bit stream of the current image region, if the coding side codes all the adjustment values for K pixel groups, the decoding side can obtain all the adjustment values for K pixel groups from the bit stream of the current image region. If the coding side codes part of the adjustment values for K pixel groups, the decoding side can obtain the part of the adjustment values for K pixel groups from the bit stream of the current image region. For example, if the decoding side obtains the Y-channel adjustment value but does not obtain the U-channel adjustment value and the V-channel adjustment value, the decoding side only adjusts the Y-channel reconstruction value of each pixel point within the corresponding pixel group based on the Y-channel adjustment value, but does not adjust the U-channel reconstruction value and the V-channel reconstruction value of each pixel point within the pixel group. In addition, if the decoding side does not obtain an adjusted value for one of the K pixel groups, the decoding side no longer adjusts the reconstruction value for each pixel point within that pixel group.

In a possible implementation, based on the plurality of adjustment values for the K pixel groups, the coding side codes all of the adjustment values or part of the adjustment values in the bit stream of the current image region, which may include, but is not limited to, the following steps.

At step S31, a plurality of adjustment values are sorted according to a coding order of the plurality of adjustment values.

Taking 12 pixel groups (such as pixel group 1 to pixel group 12), in which adjustment values of 4 pixel groups are Y-channel adjustment values, 4 pixel groups are U-channel adjustment values and 4 pixel groups are V-channel adjustment values as an example, the current image region corresponds to 12 adjustment values, and the coding order of the 12 adjustment values can be determined.

First of all, the coding order of each pixel group can be determined. For example, when partitioning a plurality of pixel groups according to reconstruction values of each pixel point, a coding order of each pixel group can be determined according to a value range of each pixel group, such as sorting in an order from small to large, or sorting in an order from large to small. Taking an example of ordering value ranges from small to large, assuming that a value range corresponding to pixel group 1 is the smallest, a value range corresponding to pixel group 2 is the second smallest, and so on, a value range corresponding to pixel group 11 is the second largest, and a value range corresponding to pixel group 12 is the largest, i.e., the value ranges of pixel group 1 to pixel group 12 are increasing in turn, then the coding order of each pixel group may be coded sequentially from pixel group 1 to pixel group 12.

For another example, when partitioning a plurality of pixel groups according to a gradient value of each pixel point, a coding order of each pixel group can be determined according to a gradient value range of each pixel group (i.e., a gradient value result corresponding to each pixel group, such as an equivalent range with an absolute value below 10). For example, sort according to the gradient value ranges from small to large, or sort according to the gradient value ranges from large to small. Taking the order of gradient value ranges from small to large as an example, assuming that a gradient value range corresponding to pixel group 1 is the smallest, a gradient value range corresponding to pixel group 2 is the second smallest, and so on, a gradient value range corresponding to pixel group 11 is the second largest, and a gradient value range corresponding to pixel group 12 is the largest, i.e., the corresponding gradient values from pixel group 1 to pixel group 12 increase in turn, then the coding order of each pixel group can be sequentially coded from pixel group 1 to pixel group 12.

For example, when partitioning a plurality of pixel groups based on a pixel position of each pixel, a coding order of each pixel group can be determined according to a block order of each pixel group. Taking an example of sorting in an order of blocks from front to back, assuming that a sub-region corresponding to pixel group 1 is a first block of the current image region, a sub-region corresponding to pixel group 2 is a second block of the current image region, and so on, a sub-region corresponding to pixel group 11 is an eleventh block of the current image region, and a sub-region corresponding to pixel group 12 is a twelfth block of the current image region, then a coding order of each pixel group is coded from pixel group 1 to pixel group 12 in turn.

The above methods are only a few examples to determine the coding order of each pixel group, and there is no restriction on this.

It is also possible to determine a coding order of each channel, such as determining a coding order among Y channel, U channel, and V channel. The coding order is: Y channel, U channel, V channel; or, Y channel, V channel, U channel; or, U channel, Y channel, V channel; or, U channel, V channel, Y channel. The above methods are only a few examples to determine the coding order of each channel, and there is no restriction on this, and the coding order of each channel can be planned arbitrarily.

When the adjustment value for a pixel group includes adjustment values of a plurality of channels corresponding to the pixel group, the coding order of a plurality of adjustment values can be determined based on the coding order of each pixel group and the coding order of each channel. For example, the coding order of a plurality of adjustment values can be determined mainly by the coding order of pixel groups, supplemented by the coding order of each channel. For example, K pixel groups are four pixel groups, each pixel group corresponds to adjustment values of three channels, the coding order of each pixel group is pixel group 1, pixel group 2, pixel group 3 and pixel group 4, and a coding order of each channel is Y channel, U channel and V channel. Then the coding order of the 12 adjustment values can be: Y channel adjustment value, U channel adjustment value and V channel adjustment value of pixel group 1, Y channel adjustment value, U channel adjustment value and V channel adjustment value of pixel group 2, Y channel adjustment value, U channel adjustment value and V channel adjustment value of pixel group 3, and Y channel adjustment value, U channel adjustment value and V channel adjustment value of pixel group 4. For another example, the coding order of a plurality of adjustment values can be determined mainly by the coding order of each channel and supplemented by the coding order of the pixel group. Then the coding order of the 12 adjustment values can be: Y channel adjustment value of pixel group 1, Y channel adjustment value of pixel group 2, Y channel adjustment value of pixel group 3, Y channel adjustment value of pixel group 4, U channel adjustment value of pixel group 1, U channel adjustment value of pixel group 2, U channel adjustment value of pixel group 3, U channel adjustment value of pixel group 4, V channel adjustment value of pixel group 1, V channel adjustment value of pixel group 2, V channel adjustment value of pixel group 3, and V channel adjustment value of pixel group 4. The above are only two examples of the coding order of the plurality of adjustment values, and this embodiment does not limit the coding order of the plurality of adjustment values, and the coding order of the plurality of adjustment values can be configured arbitrarily.

At step S32: the plurality of adjustment values are sequentially traversed based on a sorting result.

For example, taking K pixel groups as 4 pixel groups as an example, for an adjustment value of a single channel corresponding to each pixel group, during a first traversal, an adjustment value of pixel group 1 is traversed; during a second traversal, an adjustment value of pixel group 2 is traversed; during a third traversal, an adjustment value of pixel group 3 is traversed; and during a fourth traversal, an adjustment value of pixel group 4 is traversed. For the adjustment values of the plurality of channels corresponding to pixel groups, during a first traversal, an Y channel adjustment value of pixel group 1 is traversed; during a second traversal, a U channel adjustment value of pixel group 1 is traversed; during a third traversal, a V channel adjustment value of pixel group 1 is traversed; during a fourth traversal, an Y channel adjustment value of pixel group 2 is traversed; during a fifth traversal, a U channel adjustment value of pixel group 2 is traversed, and so on. For the adjustment value of the single channel corresponding to each pixel group, they can also be traversed according to an order of each channel. Taking the order of each channel as Y channel, U channel and V channel as an example, the adjustment value of Y channel is traversed in the first traversal, the adjustment value of U channel is traversed in the second traversal and the adjustment value of V channel is traversed in the third traversal. Each pixel group and each pixel channel can also have other orders. The above is only an example of traversal order, which is not limited by the present disclosure.

At step S33: for a currently traversed adjustment value, if a current rate is less than a second rate value after coding the adjustment value into a bit stream of the current image region, the adjustment value is coded into the bit stream of the current image region, and a next adjustment value of the adjustment value is continuously traversed, and the next adjustment value is taken as the currently traversed adjustment value.

For example, the second rate value can be configured according to experience, which is not limited. When the current rate is less than the second rate value, it means that the rate control information indicates that the resource pool is sufficient. In a possible implementation, a target upper limit rate may be preconfigured, and when the current rate is close to the target upper limit rate, it indicates that the rate control information indicates that the resource pool is normal, when the current rate is greater than a sum of the target upper limit rate and a preset threshold, it indicates that the rate control information indicates that the resource pool is insufficient, and when the current rate is less than a difference between the target upper limit rate and the preset threshold, it indicates that the rate control information indicates that the resource pool is sufficient. On this basis, the difference between the target upper rate and the preset threshold can be taken as the second rate value. The second rate value may be the same as or different from the first rate value.

At step S34: for a currently traversed adjustment value, if a current rate is not less than a second rate value after coding the adjustment value into a bit stream of the current image region, coding of the adjustment value into the bit stream of the current image region can be prohibited, and the traversal of a next adjustment value of the adjustment value can be stopped, that is, a traversal process of the plurality of adjustment values can be ended.

To sum up, in this embodiment, when the coding side codes a plurality of adjustment values for K pixel groups in the bit stream of the current image region, it can sequentially traverse the plurality of adjustment values. For the currently traversed adjustment value, if the current rate is less than the second rate value after coding the adjustment value in the bit stream, the adjustment value is coded in the bit stream, and the next adjustment value of the adjustment value is continuously traversed, and if the current rate is not less than the second rate value, the adjustment value is not coded in the bit stream, and traversal of the next adjustment value of the adjustment value is stopped. Repeat this process until all adjustment values for K pixel groups have been traversed, or when the current rate is not less than the second rate value, stop traversing the adjustment values. At this point, part of or all the adjustment values for the K pixel groups can be coded in the bit stream of the current image region, and the process will not be described in detail.

Embodiment 8: In the process of transmitting the adjustment parameter, a state of the rate control will also be updated synchronously. After coding the adjustment parameter, if the rate control is still in an underflow state (less than 0, if the current rate is less than the second rate value, it means that the rate control is still in the underflow state), the rate control will continue to code the adjustment parameter. In case 1, the adjustment parameters are gradually transmitted in the form of channels, such as Y channel, U channel, V channel, R channel, G channel, B channel, and alpha channel (some channels can also be shared, such as UV channel sharing). If the rate control status is underflow, the adjustment parameters are coded (parsed in the decoding side) in sequence, and if the rate control still overflows after transmission, the next adjustment parameter will continue to be coded (parsed in the decoding side). Repeat this process until the rate control does not overflow or all adjusted parameters are transmitted. In case 2, the adjustment parameters are gradually transmitted in the form of pixel groups (at least one pixel), i.e., the adjustment parameters are transmitted one by one according to a certain scanning order and grouping, for example, according to Y channel, U channel and V channel, each channel is partitioned into four groups in a vertical direction (for example, four pixel groups), and then the adjustment parameters are transmitted one by one to update the rate control state gradually. For example, the adjustment parameter expresses that one or more classes of reconstruction values in the N coding blocks (i.e., the current image region) are adjusted, and the one or more classes of reconstruction values may be passed through a syntax or may be determined by means of export, e.g., a uniform convention on the codec side; export based on already coded information (e.g., mode information, reconstruction value information, etc.).

Embodiment 9: For Embodiment 1 to Embodiment 8, for the coding side and the decoding side, the current image region can correspond to a plurality of pixel groups. For example, all pixel points in the current image region are partitioned into the plurality of pixel groups, i.e., all pixel points are classified. In this embodiment, all pixel points in the current image region can be partitioned into the plurality of pixel groups as follows:

Manner 1: Partition all pixel points in the current image region into a plurality of pixel groups according to a pre-adjustment reconstruction value of each pixel point. In other words, classification is performed according to the pre-adjustment reconstruction value of each pixel point (hereinafter, all reconstruction values used for grouping refer to pre-adjustment reconstruction values) to obtain the plurality of pixel groups. For example, a range of reconstruction values can be evenly partitioned into A pixel groups, and a pixel group is determined based on the range in which the reconstruction value falls. For example, reconstruction values with a bit width of 8 bits (ranging from 0 to 255) can be partitioned into 16 pixel groups. The ranges for these 16 pixel groups are 0 to 15, 16 to 31, 32 to 47, 48 to 63, . . . , and 240 to 255, respectively. If the reconstruction value of a pixel point falls within the range of 0 to 15, that pixel point is partitioned into the first pixel group. If the reconstruction value falls within the range of 16 to 31, it is partitioned into the second pixel group. If the reconstruction value falls within the range of 32 to 47, it is partitioned into the third pixel group. If the reconstruction value falls within the range of 48 to 63, it is partitioned into the fourth pixel group, and so on, and if the reconstruction value falls within the range of 240 to 255, the pixel point is partitioned into the sixteenth pixel group.

For example, when partitioning all pixel points in the current image region into the plurality of pixel groups based on their reconstruction values, it can also be partitioned channel by channel. For example, taking the Y channel, the U channel, and the V channel as an example, if an Y channel reconstruction value of a pixel point is in the range 0 to 15, the Y channel reconstruction value of the pixel point is partitioned into the first pixel group, and based on this, the Y channel reconstruction value of the pixel point can be adjusted based on the Y channel adjustment value for the first pixel group. If a U channel reconstruction value of the pixel point is in the range of 16 to 31, the U channel reconstruction value of the pixel point is partitioned into the second pixel group, and based on this, the U channel reconstruction value of the pixel point can be adjusted based on the U channel adjustment value for the second pixel group. If a V channel reconstruction value of the pixel point is in the range of 16 to 31, the V channel reconstruction value of the pixel point is partitioned into the second pixel group, and based on this, the V channel reconstruction value of the pixel point can be adjusted based on the V channel adjustment value for the second pixel group.

Manner 2: Determine a classification value of a pixel point based on pre-adjustment reconstruction values of its surrounding pixel points (hereinafter, all reconstruction values used for grouping refer to pre-adjustment reconstruction values). Then, divide all pixel points in the current image region into a plurality of pixel groups according to their classification values. For example, the plurality of pixel groups can be obtained by classification according to the gradient values of each pixel point.

For example, a pixel point can be classified based on the reconstruction values of the pixel points surrounding the pixel point, such as by using gradient information, reconstruction values of neighboring pixel points on an upper side of the pixel point can be subtracted from reconstruction values of neighboring pixel points on a left side of the pixel point to obtain a gradient value of the pixel point. Pixel points whose absolute values are within a certain range can be defined as the same category, such as those whose absolute values are below 10 as a first category, those whose absolute values are between 10 and 30 as a second category, and those whose absolute values are greater than 30 as a third category. On this basis, for a pixel point, if an absolute value of the gradient value of the pixel point is below 10, the pixel point is partitioned into a first pixel group, if the absolute value of the gradient value of the pixel point is between 10 and 30, the pixel point is partitioned into a second pixel group, and if the absolute value of the gradient value of the pixel point is above 30, the pixel point is partitioned into a third pixel group.

Manner 3: Partition all pixel points in the current image region into a plurality of pixel groups according to a pixel position of each pixel point, i.e., the plurality of pixel groups can be obtained by classifying each pixel point according to its pixel position. For example, it can be classified according to the pixel position, such as partitioning the current image region of 16*2 into four 4*2 sub-regions, and each 4*2 sub-region is partitioned into one category. On this basis, for a certain pixel point, if it is located in a first 4*2 sub-region, it can be partitioned into a first pixel group. If it is located in a second 4*2 sub-region, it can be partitioned into a second pixel group. If it is located in a third 4*2 sub-region, it can be partitioned into a third pixel group. If it is located in a fourth 4*2 sub-region, it can be partitioned into a fourth pixel group.

Manner 4: Each pixel point can be partitioned into a pixel group, i.e., each pixel point is a pixel group, and different pixel points correspond to different pixel groups, which can be understood that a pixel group includes a pixel point.

The above methods are only a few examples of partition manners, and there is no restriction on the partition manner.

Embodiment 10: For Embodiment 1 to Embodiment 8, for the coding side and the decoding side, the current image region can correspond to a plurality of pixel groups. For example, all pixel points in the current image region are partitioned into the plurality of pixel groups, i.e., all pixel points are classified. In this embodiment, a plurality of pixel groups corresponding to the current image region can be determined in the following manner: a plurality of pixel groups corresponding to the current image region can be determined according to a prediction mode of the current image region, i.e., the partition of pixel groups can be related to the prediction mode of the current image region. For example, a partition attribute of pixel groups can be determined according to the prediction mode of the current image region, and a plurality of pixel groups corresponding to the current image region can be determined based on the partition attribute.

For example, the partition attribute may include at least one of a number of partitions, a filtering region, or a partition manner. If the partition attribute includes the number of partitions, the filtering region and the partition manner, a number of partitions, a filtering region and a partition manner for partitioning pixel groups are determined based on the prediction mode of the current image region, and the plurality of pixel groups corresponding to the current image region are determined based on the number of partitions, the filtering region and the partition manner. If the partition attribute includes the number of partitions and partition manner, the number of partitions and the partition manner for partitioning pixel groups are determined according to the prediction mode of the current image region, and the plurality of pixel groups corresponding to the current image region are determined based on the number of partitions and the partition manner. Other combinations of partition attributes are implemented in a similar way, and will not be described in detail in this embodiment.

The number of partitions indicates how many pixel groups the current image region is partitioned into, the filtering region indicates which part of the current image region is partitioned into the plurality of pixel groups, and the partition manner indicates a size specification of each pixel group.

If the partition attribute includes the filtering region, the filtering region can mean that entire region of the current image region is partitioned into a plurality of pixel groups, or it can mean that part of the current image region is partitioned into a plurality of pixel groups. If the partition attribute does not include the filtering region, it means that entire region of the current image region is partitioned into a plurality of pixel groups.

For example, the prediction mode of the current image region can be partitioned into horizontal prediction mode and non-horizontal prediction mode. If the prediction mode of the current image region is a horizontal prediction mode, it can be determined that the number of partitions of the pixel group is a first number of partitions, the filtering region of the pixel group is a first filtering region, and the partition manner is a first size specification. If the prediction mode of the current image region is a non-horizontal prediction mode, it can be determined that the number of partitions of the pixel group is a second number of partitions, the filtering region of the pixel group is a second filtering region, and the partition manner is a second size specification. Or, if the prediction mode of the current image region is a horizontal prediction mode, it can be determined that the number of partitions of the pixel group is a first number of partitions and the partition manner is a first size specification. If the prediction mode of the current image region is a non-horizontal prediction mode, it can be determined that the number of partitions of the pixel group is a second number of partitions and the partition manner is a second size specification. For another example, the prediction mode of the current image region can be partitioned into vertical prediction mode and non-vertical prediction mode. If the prediction mode of the current image region is a vertical prediction mode, it is determined that the number of partitions of the pixel group is a third number of partitions, the filtering region of the pixel group is a third filtering region, and the partition manner is a third size specification. If the prediction mode of the current image region is a non-vertical prediction mode (not the vertical prediction mode), it is determined that the number of partitions of the pixel group is a fourth number of partitions, the filtering region of the pixel group is a fourth filtering region, and the partition manner is a fourth size specification. Or, if the prediction mode of the current image region is a vertical prediction mode, it is determined that the number of partitions of the pixel group is a third number of partitions, and the partition manner is a third size specification. If the prediction mode of the current image region is non-vertical prediction mode, it is determined that the number of partitions of the pixel group is a fourth number of partitions, and the partition manner is a fourth size specification. The distinguishing methods of horizontal prediction mode and non-horizontal prediction mode, and distinguishing methods of vertical prediction mode and non-vertical prediction mode are just two examples, and there is no restriction on this.

For example, the prediction manners of the current image region can be partitioned into a first prediction mode and a non-first prediction mode. The first prediction mode corresponds to partition attributes (number of partitions, filter region and partition manner) of a first type, and the non-first prediction mode corresponds to partition attributes (number of partitions, filter region and partition manner) of a second type. For another example, the prediction manners of the current image region can be partitioned into a first prediction mode, a second prediction mode, and a non-first non-second prediction mode. The first prediction mode corresponds to partition attributes (number of partitions, filter region and partition manner) of a first type, the second prediction mode corresponds to partition attributes (number of partitions, filter region and partition manner) of a second type, and the non-first non-second prediction mode corresponds to partition attributes (number of partitions, filter region and partition manner) of a third type. For another example, the prediction mode of the current image region can be partitioned into a first prediction mode and a second prediction mode. The first prediction mode corresponds to partition attributes (number of partitions, filter region and partition manner) of a first type, and the second prediction mode corresponds to partition attributes (number of partitions, filter region and partition manner) of a second type.

In practical application, it can also be partitioned into more prediction modes, and there is no restriction on this.

For convenience of description, in this embodiment, the prediction mode of the current image region is partitioned into horizontal prediction mode and non-horizontal prediction mode as an example. If the prediction mode of the current image region is a horizontal prediction mode, it is determined that the number of partitions of the pixel group is a first number of partitions, the filtering region of the pixel group is a first filtering region, and the partition manner is a first size specification. If the prediction mode of the current image region is a non-horizontal prediction mode, it is determined that the number of partitions of the pixel group is a second number of partitions, the filtering region of the pixel group is a second filtering region, and the partition manner is a second size specification.

The first number of partitions can be configured according to experience, such as 2, 4, 6, 8, 16, etc., and there is no restriction on this. With respect to the first filtering region, it may be all of the current image region or part of the current image region, and there is no restriction on this. With respect to the first size specification, which can be configured empirically, the first size specification may include a width and a height, the width may be 2, 4, 6, 8, 12, 16, etc., for which there is no limitation, and the height may be 1, 2, 4, 6, 8, 12, 16, etc., for which there is no limitation. In addition, the second number of partitions can be configured according to experience, such as 2, 4, 6, 8, 16, etc., and there is no restriction on this. With respect to the second filtering region, it may be all of the current image region or part of the current image region, and there is no restriction on this. With respect to the second size specification, which can be configured empirically, the second size specification may include a width and a height, the width may be 2, 4, 6, 8, 12, 16, etc., for which there is no limitation, and the height may be 1, 2, 4, 6, 8, 12, 16, etc., for which there is no limitation.

For example, if the current image region is a 16*2 image block, when the prediction mode of the current image region is a horizontal prediction mode, all pixel points in the current image region can be partitioned into four pixel groups, and each pixel group is of a size 8*1. In this case, the first number of partitions is 4, the first filtering region is the entire region of the current image region, and the first size specification is 8*1. As shown in FIG. 5A, a 16*2 image block is partitioned into four 8*1 pixel groups.

Figures 5B, 5C, 5D, 6A, 6B, 6C, 6D:
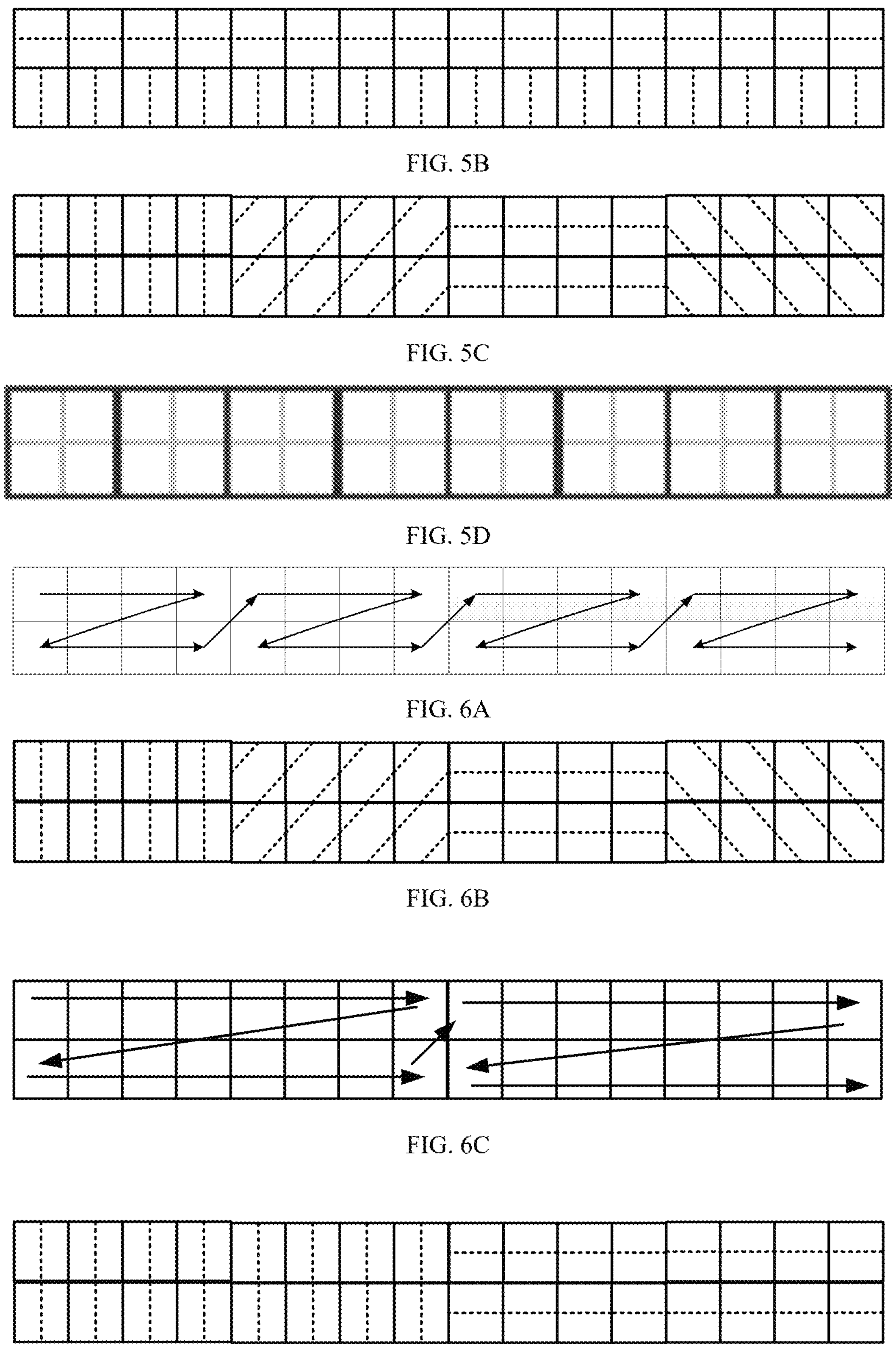
FIGS. 6A to 6J are schematic diagrams of image block partition in an embodiment of the present disclosure.

Or, all pixel points in the current image region can be partitioned into two pixel groups, and each pixel group is of a size 16*1. In this case, the first number of partitions is 2, the first filtering region is the entire region of the current image region, and the first size specification is 16*1. As shown in FIG. 5B, a 16*2 image block is partitioned into two 16*1 pixel groups.

Or, all pixel points in the current image region can be partitioned into four pixel groups, and each pixel group is of a size 4*2. In this case, the first number of partitions is 4, the first filtering region is the entire region of the current image region, and the first size specification is 4*2. As shown in FIG. 5C, a 16*2 image block is partitioned into four 4*2 pixel groups.

Or, all pixel points in the current image region can be partitioned into eight pixel groups, and each pixel group is of a size 2*2. In this case, the first number of partitions is 8, the first filtering region is the entire region of the current image region, and the first size specification is 2*2. As shown in FIG. 5D, a 16*2 image block is partitioned into eight 2*2 pixel groups.

The above are just a few examples of the partition in the horizontal prediction mode, and there is no restriction on this.

In addition, if the current image region is a 16*2 image block, when the prediction mode of the current image region is a non-horizontal prediction mode (not the horizontal prediction mode), all the pixel points in the current image region can be partitioned into four pixel groups, where each pixel group is of a size 4*2. In this case, the second number of partitions is 4, the second filtering region is the entire region of the current image region, and the second size specification is 4*2. As shown in FIG. 5C, a 16*2 image block is partitioned into four 4*2 pixel groups.

Or, all pixel points in the current image region can be partitioned into four pixel groups, and each pixel group is of a size 8*1. In this case, the second number of partitions is 4, the second filtering region is the entire region of the current image region, and the second size specification is 8*1. As shown in FIG. 5B, a 16*2 image block is partitioned into four 8*1 pixel groups.

Or, all pixel points in the current image region can be partitioned into two pixel groups, and each pixel group is of a size 16*1. In this case, the second number of partitions is 2, the second filtering region is the entire region of the current image region, and the second size specification is 16*1. As shown in FIG. 5B, a 16*2 image block is partitioned into two 16*1 pixel groups.

Or, all pixel points in the current image region can be partitioned into eight pixel groups, and each pixel group is of a size 2*2. In this case, the second number of partitions is 8, the second filtering region is the entire region of the current image region, and the second size specification is 2*2. As shown in FIG. 5D, a 16*2 image block is partitioned into eight 2*2 pixel groups.

The above are just a few examples of the partition in the non-horizontal prediction mode, and there is no restriction on this.

For another example, if the current image region is an 8*2 image block, when the prediction mode of the current image region is a horizontal prediction mode, all pixel points in the current image region can be partitioned into two pixel groups, and each pixel group is of a size 4*2. In this case, the first number of partitions is 2, the first filtering region is the entire region of the current image region, and the first size specification is 4*2. Or, all pixel points in the current image region can be partitioned into two pixel groups, and each pixel group is of a size 8*1. In this case, the first number of partitions is 2, the first filtering region is the entire region of the current image region, and the first size specification is 8*1. Or, all current image region can be partitioned into one pixel group, and each pixel group is of a size 8*2. In this case, the first number of partitions is 1, the first filtering region is the entire region of the current image region, and the first size specification is 8*2. Or, all pixel points in the current image region can be partitioned into eight pixel groups, and each pixel group is of a size 2*2. In this case, the first number of partitions is 4, the first filtering region is the entire region of the current image region, and the first size specification is 2*2. The above are just a few examples of the partition in the horizontal prediction mode, and there is no restriction on this.

In addition, if the current image region is an 8*2 image block, when the prediction mode of the current image region is a non-horizontal prediction mode, all pixel points in the current image region can be partitioned into two pixel groups, and each pixel group is of a size 4*2. In this case, the second number of partitions is 2, the second filtering region is the entire region of the current image region, and the second size specification is 4*2. Or, all pixel points in the current image region can be partitioned into two pixel groups, and each pixel group is of a size 8*1. In this case, the second number of partitions is 2, the second filtering region is the entire region of the current image region, and the second size specification is 8*1. Or, all current image region can be partitioned into one pixel group, and each pixel group is of a size 8*2. In this case, the second number of partitions is 1, the second filtering region is the entire region of the current image region, and the second size specification is 8*2. Or, all pixel points in the current image region can be partitioned into eight pixel groups, and each pixel group is of a size 2*2. In this case, the second number of partitions is 4, the second filtering region is the entire region of the current image region, and the second size specification is 2*2. The above are just a few examples of the partition in the non-horizontal prediction mode, and there is no restriction on this.

For another example, if the current image region is a 16*1 image block, when the prediction mode of the current image region is a horizontal prediction mode, all pixel points in the current image region can be partitioned into two pixel groups, and each pixel group is of a size 8*1. In this case, the first number of partitions is 2, the first filtering region is the entire region of the current image region, and the first size specification is 8*1. Or, all pixel points in the current image region can be partitioned into four pixel groups, and each pixel group is of a size 4*1. In this case, the first number of partitions is 4, the first filtering region is the entire region of the current image region, and the first size specification is 4*1. Or, all current image region can be partitioned into one pixel group, and each pixel group is of a size 16*1. In this case, the first number of partitions is 1, the first filtering region is the entire region of the current image region, and the first size specification is 16*1. Or, all pixel points in the current image region can be partitioned into eight pixel groups, and each pixel group is of a size 2*1. In this case, the first number of partitions is 8, the first filtering region is the entire region of the current image region, and the first size specification is 2*1. The above are just a few examples of the partition in the horizontal prediction mode, and there is no restriction on this.

In addition, if the current image region is a 16*1 image block, when the prediction mode of the current image region is a non-horizontal prediction mode, all pixel points in the current image region can be partitioned into two pixel groups, and each pixel group is of a size 8*1. In this case, the second number of partitions is 2, the second filtering region is the entire region of the current image region, and the second size specification is 8*1. Or, all pixel points in the current image region can be partitioned into four pixel groups, and each pixel group is of a size 4*1. In this case, the second number of partitions is 4, the second filtering region is the entire region of the current image region, and the second size specification is 4*1. Or, all current image region can be partitioned into one pixel group, and each pixel group is of a size 16*1. In this case, the second number of partitions is 1, the second filtering region is the entire region of the current image region, and the second size specification is 16*1. Or, all pixel points in the current image region can be partitioned into eight pixel groups, and each pixel group is of a size 2*1. In this case, the second number of partitions is 8, the second filtering region is the entire region of the current image region, and the second size specification is 2*1. The above are just a few examples of the partition in the non-horizontal prediction mode, and there is no restriction on this.

For another example, if the current image region is an 8*1 image block, when the prediction mode of the current image region is a horizontal prediction mode, all pixel points in the current image region can be partitioned into two pixel groups, and each pixel group is of a size 4*1. In this case, the first number of partitions is 2, the first filtering region is the entire region of the current image region, and the first size specification is 4*1. Or, all pixel points in the current image region can be partitioned into four pixel groups, and each pixel group is of a size 2*1. In this case, the first number of partitions is 4, the first filtering region is the entire region of the current image region, and the first size specification is 2*1. Or, all current image region can be partitioned into one pixel group, and each pixel group is of a size 8*1. In this case, the first number of partitions is 1, the first filtering region is the entire region of the current image region, and the first size specification is 8*1. The above are just a few examples of the partition in the horizontal prediction mode, and there is no restriction on this.

In addition, if the current image region is an 8*1 image block, when the prediction mode of the current image region is a non-horizontal prediction mode, all pixel points in the current image region can be partitioned into two pixel groups, and each pixel group is of a size 4*1. In this case, the second number of partitions is 2, the second filtering region is the entire region of the current image region, and the second size specification is 4*1. Or, all pixel points in the current image region can be partitioned into four pixel groups, and each pixel group is of a size 2*1. In this case, the second number of partitions is 4, the second filtering region is the entire region of the current image region, and the second size specification is 2*1. Or, all current image region can be partitioned into one pixel group, and each pixel group is of a size 8*1. In this case, the second number of partitions is 1, the second filtering region is the entire region of the current image region, and the second size specification is 8*1. The above are just a few examples of the partition in the non-horizontal prediction mode, and there is no restriction on this.

In practical application, when the size of the current image region is other sizes, such as a 16*4 image block, an 8*4 image block, a 16*8 image block, etc., it is partitioned in a manner similar to that described above, which will not be repeated in this embodiment.

Embodiment 11: For Embodiment 1 to Embodiment 8, for the coding side and the decoding side, the current image region can correspond to a plurality of pixel groups. For example, all pixel points in the current image region are partitioned into the plurality of pixel groups, i.e., all pixel points are classified. In this embodiment, the plurality of pixel groups corresponding to the current image region can be determined in the following manner: using a default strategy to determine the plurality of pixel groups corresponding to the current image region. For example, the default strategy can be used to determine a partition attribute of pixel groups, and the plurality of pixel groups corresponding to the current image region can be determined based on the partition attribute. For example, the partition attribute may include at least one of a number of partitions, a filtering region or a partition manner. If the partition attribute includes the number of partitions, the filtering region and the partition manner, a number of partitions, a filtering region and a partition manner for partitioning pixel groups are determined, and the plurality of pixel groups corresponding to the current image region are determined based on the number of partitions, the filtering region and the partition manner. If the partition attribute includes the number of partitions and partition manner, the number of partitions and the partition manner for partitioning pixel groups are determined, and the plurality of pixel groups corresponding to the current image region are determined based on the number of partitions and the partition manner. The number of partitions indicates how many pixel groups the current image region is partitioned into, the filtering region indicates which part of the current image region is partitioned into the plurality of pixel groups, and the partition manner indicates a size specification of each pixel group.

In the above mode, the number of partitions, filtering region and partition manner can all be specified based on the default strategy, such as specifying that the number of partitions is a first number of partitions, the filtering region is a first filtering region, and the partition manner is a first size specification, or for example, specifying that the number of partitions is a second number of partitions, the filtering region is a second filtering region, and the partition manner is a second size specification.

The number of partitions can be configured according to experience, such as 2, 4, 6, 8, 16, etc., which is not limited. The filter region can be all of the current image region or part of the current image region, and there is no restriction on this. The size specification corresponding to the partition manner can be configured empirically, the second size specification may include a width and a height, the width may be 2, 4, 6, 8, 12, 16, etc., for which there is no limitation, and the height may be 1, 2, 4, 6, 8, 12, 16, etc., for which there is no limitation.

For example, if the current image region is a 16*2 image block, all pixel points in the current image region can be partitioned into four pixel groups, where each pixel group is of a size 8*1. Or, all the pixel points in the current image region can be partitioned into two pixel groups, where each pixel group is of a size 16*1. Or, all the pixel points in the current image region can be partitioned into four pixel groups, where each pixel group is of a size 4*2. Or, all the pixel points in the current image region can be partitioned into eight pixel groups, where each pixel group is of a size 2*2. The above are only examples and no limitations are made herein.

For another example, if the current image region is an 8*2 image block, all pixel points in the current image region can be partitioned into two pixel groups, where each pixel group is of a size 4*2. Or, all the pixel points in the current image region can be partitioned into two pixel groups, where each pixel group is of a size 8*1. Or, all the pixel points in the current image region can be partitioned into one pixel group, where each pixel group is of a size 8*2. Or, all the pixel points in the current image region can be partitioned into four pixel groups, where each pixel group is of a size 2*2. The above are only examples and no limitations are made herein.

For another example, if the current image region is a 16*1 image block, all pixel points in the current image region can be partitioned into two pixel groups, where each pixel group is of a size 8*1. Or, all the pixel points in the current image region can be partitioned into four pixel groups, where each pixel group is of a size 4*1. Or, all the pixel points in the current image region can be partitioned into one pixel group, where each pixel group is of a size 16*1. Or, all the pixel points in the current image region can be partitioned into eight pixel groups, where each pixel group is of a size 2*1. The above are only examples and no limitations are made herein.

For another example, if the current image region is an 8*1 image block, all pixel points in the current image region can be partitioned into two pixel groups, where each pixel group is of a size 4*1. Or, all the pixel points in the current image region can be partitioned into four pixel groups, where each pixel group is of a size 2*1. Or, all the pixel points in the current image region can be partitioned into one pixel group, where each pixel group is of a size 8*1. The above are only examples and no limitations are made herein.

In practical application, when the size of the current image region is other sizes, such as a 16*4 image block, an 8*4 image block, a 16*8 image block, etc., it is partitioned in a manner similar to that described above, which will not be repeated in this embodiment.

Embodiment 12: For Embodiment 1 to Embodiment 8, for the coding side and the decoding side, the current image region can correspond to a plurality of pixel groups. For example, all pixel points in the current image region are partitioned into the plurality of pixel groups, i.e., all pixel points are classified. In this embodiment, a plurality of pixel groups corresponding to the current image region can be determined in the following manner: a plurality of pixel groups corresponding to the current image region can be determined according to a scanning order of the current image region, i.e., the partition of pixel groups can be related to the scanning order of the current image region. This manner can be understood as: using the scanning order of the current image region, all pixel points in the current image region are rearranged into one dimension, and then the current image region is divided into pixel groups.

For the scanning order of the current image region, at the coding side, it can be understood as an order in which residual coefficients are coded into a bit stream. Therefore, when a plurality of pixel groups corresponding to the current image region are determined according to the scanning order of the current image region, the order of the plurality of pixel groups is consistent with the order in which the residual coefficients are coded into the bit stream, and when the reconstruction value of each pixel point in the pixel group is adjusted, waiting time can be reduced, so that the hardware processing performance of the coding side can be improved. At the decoding side, it can be understood as the order of parsing the residual coefficients from the bit stream. Therefore, when a plurality of pixel groups corresponding to the current image region are determined according to the scanning order of the current image region, the order of the plurality of pixel groups is consistent with the order in which the residual coefficients are parsed, and when the reconstruction value of each pixel point in the pixel group is adjusted, waiting time can be reduced, so that the hardware processing performance of the decoding side can be improved.

For example, the scanning order of the current image region may be a raster scanning order, such as a raster scanning order for sub-blocks of the current image region and a raster scanning order for the current image region. Take the current image region is 16*2 image block as an example, as shown in FIG. 6A, it is the raster scanning order for the sub-blocks of the current image region. In practical application, the 16*2 image block can be partitioned into four 4*2 sub-blocks. The 16*2 image block can also be partitioned into two 8*2 sub-blocks or sub-blocks of other sizes, and there is no restriction on this. For four 4*2 sub-blocks, referring to the raster scanning order shown in FIG. 6A, the current image region can be partitioned into four 4*2 pixel groups. Obviously, the raster scanning order is to scan pixel points of a first sub-block, then pixel points of a second sub-block, then pixel points of a third sub-block, and then pixel points of a fourth sub-block. Therefore, as shown in FIG. 6B, each pixel point of the first sub-block can be partitioned into the first pixel group, each pixel point of the second sub-block can be partitioned into the second pixel group, each pixel point of the third sub-block can be partitioned into the third pixel group, and each pixel point of the fourth sub-block can be partitioned into the fourth pixel group. Similarly, as shown in FIG. 6D, according to the raster scanning order shown in FIG. 6C, the current image region can be partitioned into two 8*2 pixel groups.

Figure 6E:
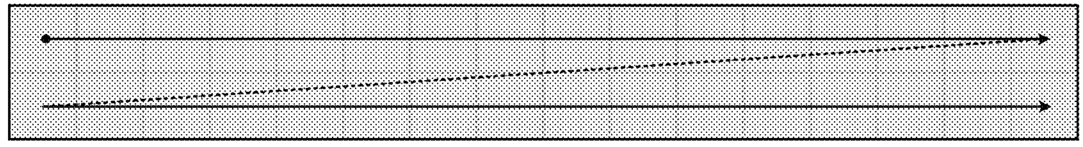
Figure 6F:
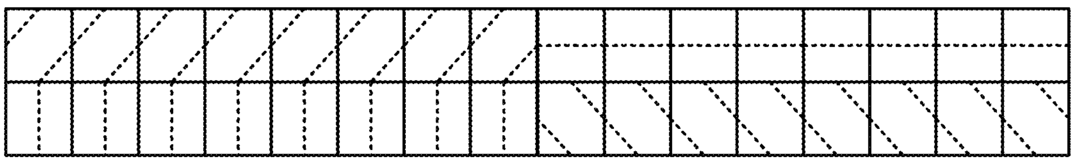
Figure 6G:
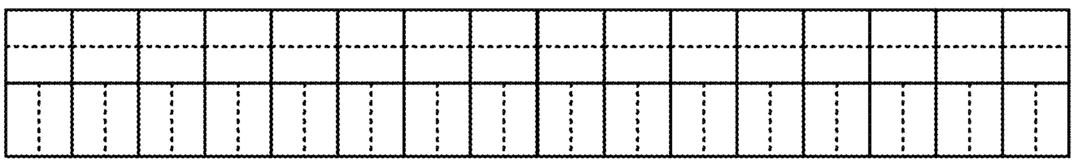

As shown in FIG. 6E, it is a raster scanning order for the current image region (i.e., the entire current image region), and the current image region can be partitioned into four 8*1 pixel groups, as shown in FIG. 6F; and the current image region can also be partitioned into two 16*1 pixel groups, as shown in FIG. 6G. The raster scanning order in FIG. 6E is to scan the 16 pixel points in a first row first, and then scan the 16 pixel points in a second row, so the partition of FIG. 6F or FIG. 6G can be used.

Figure 6H:
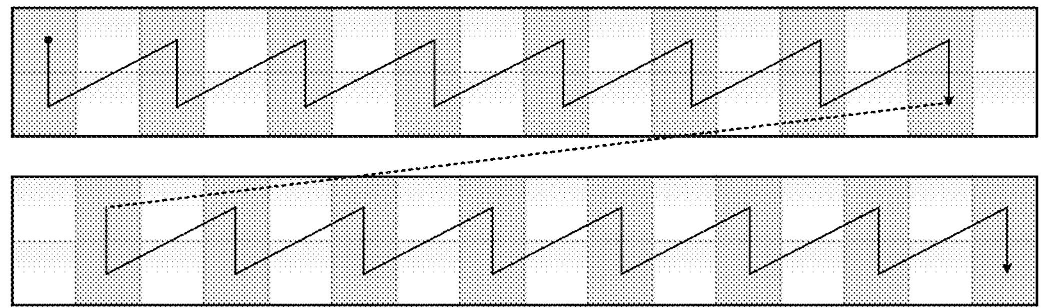

For example, the scanning order of the current image region may be an interlaced scanning manner, take the current image region is a 16*2 image block as an example, see FIG. 6H for the scanning order for the current image region, i.e., scanning a first pixel point of the first row first, then scanning a first pixel point of the second row, and then scanning a third pixel point of the first row, and so on. According to the scanning order shown in FIG. 6H, the current image region can be partitioned into four 4*2 pixel groups, as shown in FIG. 6I, or the current image region can be partitioned into two 8*2 pixel groups, as shown in FIG. 6J.

Figure 6I:
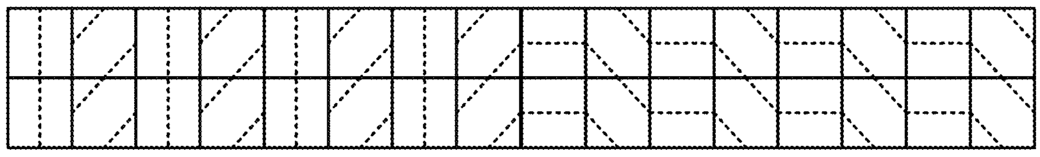
Figure 6J:
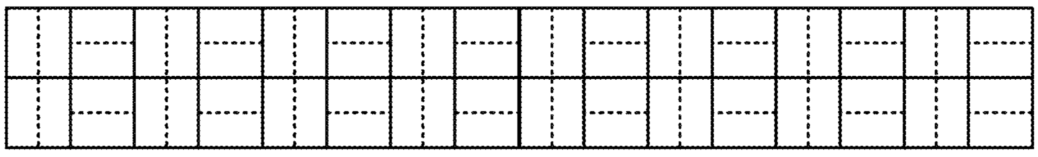

As shown in FIG. 6I, pixel points in columns 1, 3, 5 and 7 can be grouped into a pixel group, pixel points in columns 2, 4, 6 and 8 can be grouped into a pixel group, pixel points in columns 9, 11, 13 and 15 can be grouped into a pixel group, and pixel points in columns 10, 12, 14 and 16 can be grouped into a pixel group. As shown in FIG. 6H, pixel points in columns 1, 3, 5, 7, 9, 11, 13 and 15 can be grouped into a pixel group, and pixel points in columns 2, 4, 6, 8, 10, 12, 14 and 16 can be grouped into a pixel group.

Embodiment 13: For Embodiment 1 to Embodiment 12, for the coding side and the decoding side, a reconstruction value of a pixel point can be adjusted based on an adjustment value. Regarding a value range of the adjustment value, it can be [−7,7], of course, the value range of [−7,7] is only an example, and there is no restriction on this, such as the value range of the adjustment value can be [−4,4], [−5,5], [−6,6], [−8,8], and the value range of the adjustment value can be [−4,6], [−6,5], [−6,8], [−8,4]. Obviously, the range of adjustment values can be set arbitrarily.

In a possible embodiment, a binarization of the value range of [−7,7] can be seen in Table 1.

TABLE 1

| Adjustment value | Code word | Code length |
|---|---|---|
| −7 | 11000001 | 8 |
| −6 | 11000011 | 8 |
| −5 | 1100111 | 7 |
| −4 | 110001 | 6 |
| −3 | 11010 | 5 |
| −2 | 000 | 3 |
| −1 | 01 | 2 |
| 0 | 111 | 3 |
| 1 | 10 | 2 |
| 2 | 001 | 3 |
| 3 | 11011 | 5 |
| 4 | 110010 | 6 |
| 5 | 1100110 | 7 |
| 6 | 11000010 | 8 |
| 7 | 11000000 | 8 |

In a possible embodiment, the value range of the adjustment value can also be determined based on the quantization step, that is, the value range of the adjustment value can be related to the quantization step. For example, when the quantization step is 8, a maximum quantization error is 4, so the value range of the adjustment value can be [−4,4]. In this case, the adjustment value less than −4 or greater than 4 will not appear. Obviously, as shown in Table 2, the binarization shown in Table 1 can be adjusted. In practical application, different ranges of adjustment values can be configured for different quantization steps, and there is no restriction on this value range. For another example, when the quantization step is 10, the value range of the adjustment value can be [−5,5], and so on.

TABLE 2

| Adjustment value | Code word | Code length |
|---|---|---|
| −4 | 11000 | 5 |
| −3 | 11010 | 5 |
| −2 | 000 | 3 |
| −1 | 01 | 2 |
| 0 | 111 | 3 |
| 1 | 10 | 2 |
| 2 | 001 | 3 |
| 3 | 11011 | 5 |
| 4 | 11001 | 5 |

In another possible embodiment, different quantization steps can correspond to different value ranges of adjustment values, and the number of values in the value range of adjustment values is the same, but there can be a gap between two adjacent values. For example, quantization step A corresponds to a value range of [−3, 3], and there are a total of 7 values, such as −3, −2, −1, 0, 1, 2, and 3. Quantization step B (which can be larger than quantization step A) corresponds to a value range of [−6, 6], but there are only 7 values, such as −6, −4, −2, 0, 2, 4, and 6. Similarly, quantization step C (which can be larger than quantization step B) corresponds to a value range of [−9, 9], but there are only 7 values, such as −9, −6, −3, 0, 3, 6, 9, and so on.

Embodiment 14: Considering a hardware limitation, in a possible implementation, a filtered reconstruction value of the current image region cannot be used for reference of other image blocks in a same row, but only for reference of other image blocks in a next row. For other image blocks in the same row as the current image region, only a reconstruction value before filtering of the current image region can be referenced.

Embodiment 15: For Embodiment 1 to Embodiment 13, the bit stream sent by the coding side to the decoding side needs to carry the following contents.

1. Adjustment parameter. The adjustment parameter may include multiple adjustment values. For example, for each channel, the adjustment parameter may include an adjustment value of the channel or at least two adjustment values of the channel. For convenience of description, one channel is taken as an example. For example, the current image region can correspond to a plurality of pixel groups, and the bit stream of the current image region only includes adjustment values for K pixel groups, and the K pixel groups are part of or all the plurality of the pixel groups.

Assuming that the bit stream of the current image region includes M adjustment values for K pixel groups, M can be a positive integer, and M can be less than or equal to K, i.e., M is greater than or equal to 1 and less than or equal to K.

For example, if K pixel groups correspond to the same adjustment value, such as adjustment value A, the bit stream of the current image region can only include one adjustment value, namely adjustment value A, so M adjustment values are one adjustment value.

If K pixel groups correspond to two adjustment values, for example, pixel group 1 and pixel group 2 correspond to adjustment value A, and pixel group 3 and pixel group 4 correspond to adjustment value B, the bit stream of the current image region can include two adjustment values, namely adjustment value A and adjustment value B. Therefore, M adjustment values are two adjustment values. Or, the bit stream of the current image region may include four adjustment values, namely, adjustment value A corresponding to pixel group 1, adjustment value A corresponding to pixel group 2, adjustment value B corresponding to pixel group 3 and adjustment value B corresponding to pixel group 4, so M adjustment values are four adjustment values.

If K pixel groups correspond to K adjustment values, for example, pixel group 1 corresponds to adjustment value A, pixel group 2 corresponds to adjustment value B, pixel group 3 corresponds to adjustment value C, and pixel group 4 corresponds to adjustment value D, the bit stream of the current image region can include four adjustment values, namely, adjustment value A, adjustment value B, adjustment value C and adjustment value D, so M adjustment values are four adjustment values.

2. Pixel group indication information. When the current image region corresponds to a plurality of pixel groups (for example, 32 pixel groups), the pixel group indication information indicates K pixel groups in all the pixel groups, indicating that the bit stream carries adjustment values for these K pixel groups. Obviously, if the K pixel groups are all pixel groups, there is no need to carry pixel group indication information in the bit stream, and the decoding side can know that K pixel groups are all pixel groups (for example, 32 pixel groups). If the K pixel groups are part of all pixel groups, the decoding side needs to know which pixel groups the K pixel groups are. At this time, the following methods can be adopted:

Explicit manner: When the coding side sends the bit stream of the current image region to the decoding side, the bit stream of the current image region carries the pixel group indication information, indicating that the bit stream carries the adjustment value of the pixel group corresponding to the pixel group indication information. The decoding side may parse the pixel group indication information corresponding to the K pixel groups from the bit stream of the current image region, and be informed that the adjustment parameter carried in the bit stream includes the adjustment values of the K pixel groups corresponding to the pixel group indication information.

For example, the pixel group indication information includes index values for K pixel groups, these index value indicate a position of a pixel group among all pixel groups. Taking an example where the K pixel groups include pixel group 1, pixel group 2, pixel group 3, and pixel group 4, the pixel group indication information can include an index value for pixel group 1, an index value for pixel group 2, an index value for pixel group 3, and an index value for pixel group 4.

For another example, assuming the K pixel groups are consecutive, the pixel group indication information can include index values of part of the K pixel groups, while index values of the remaining pixel groups can be implicitly derived. Taking an example where the K pixel groups include pixel group 1, pixel group 2, pixel group 3, and pixel group 4, the pixel group indication information can include only an index value of pixel group 1. Since the K pixel groups are consecutive, index values of pixel group 2, pixel group 3, and pixel group 4 can be implicitly derived.

Implicit manner: If the K pixel groups are part of all pixel groups and are located at default positions, such as the K pixel groups are fixed to the first four pixel groups, or the K pixel groups are fixed to the first, third, fifth and seventh pixel groups, or the K pixel groups are fixed to the last four pixel groups, the coding side may not code the pixel group indication information corresponding to these K pixel groups in the bit stream of the current image region. Similarly, the decoding side does not need to parse the pixel group indication information corresponding to these K pixel groups from the bit stream of the current image region. On this basis, the decoding side may be informed that the adjustment parameter carried in the bit stream include adjustment values for the K pixel groups at default positions. For instance, the adjustment parameters include the adjustment values for the first four pixel groups, or for the 1st, 3rd, 5th, and 7th pixel groups, or for the last four pixel groups.

3. Adjustment value grouping indication information. When the bit stream of the current image region carries M adjustment values for K pixel groups, the adjustment value grouping indication information indicates a matching relationship between M adjustment values and K pixel groups.

In a possible embodiment, if the M adjustment values are only one adjustment value or K adjustment values, the adjustment value grouping indication information may be a flag bit, that is, the adjustment value grouping indication information only has a fourth value and a fifth value. In this case, if K pixel groups correspond to the same adjustment value, such as K pixel groups all corresponding to adjustment value A, then the adjustment value grouping indication information can be the fourth value, which represents that K pixel groups correspond to the same adjustment value. After the decoding side parses the adjustment value grouping indication information from the bit stream, if it is known that the adjustment value grouping indication information is the fourth value, it can only parse one adjustment value (such as adjustment value A) from the bit stream and take this adjustment value as the adjustment value for K pixel groups.

If the K pixel groups correspond to K adjustment values, such as K pixel groups corresponding to adjustment value A, adjustment value B, adjustment value C and adjustment value D in turn (or corresponding to adjustment value A, adjustment value A, adjustment value B and adjustment value B in turn), then the adjustment value grouping indication information may be the fifth value, which indicates that K pixel groups correspond to K adjustment values. After the decoding side parses the adjustment value grouping indication information from the bit stream, if it is known that the adjustment value grouping indication information is the fifth value, it needs to parse K adjustment values from the bit stream, such as the adjustment value A, the adjustment value B, the adjustment value C and the adjustment value D in turn (or the adjustment value A, the adjustment value A, the adjustment value B and the adjustment value B in turn). At this time, the first resolved adjustment value A corresponds to the first pixel group (such as pixel group 1), the second resolved adjustment value B corresponds to the second pixel group (such as pixel group 2), the third resolved adjustment value C corresponds to the third pixel group (such as pixel group 3), and the fourth resolved adjustment value D corresponds to the fourth pixel group (such as pixel group 4).

For example, the above implementation process can be represented by a syntax table shown in Table 3.

TABLE 3

| Filter compensation definition | Descriptor |
|---|---|
| filter_flag | u(1) |
| if (FilterFlag) { | |

TABLE 3-continued

| Filter compensation definition | Descriptor |
|---|---|
| same_offset_flag | u(1) |
| if (SameOffsetFlag) { | |
| filter_offset | u(v) |
| } else { | |
| for (index=0;index<4;index++) { | |
| filter_offset[index] | u(v) |
| } | |
| } | |
| } | |

In the above syntax table, same_offset_flag indicates the adjustment value grouping indication information. If a value of same_offset_flag is the fourth value (such as 1), the decoding side needs to parse an adjustment value from the bit stream; if the value of same_offset_flag is the fifth value (such as 0), the decoding side needs to parse K adjustment values from the bit stream in turn.

For the syntax table shown in Table 3, same_offset_flag is a flag bit to decide whether it is a uniform compensation value. If same_offset_flag is the fourth value, it indicates a uniform compensation value, i.e., it is determined that K pixel groups correspond to the same adjustment value (the adjustment value in the present disclosure can also be named as compensation value), at this time, only one adjustment value needs to be parsed. If same_offset_flag is the fifth value, it indicates a non-uniform compensation value, i.e., it is determined that K pixel groups correspond to K adjustment values, at this time, K adjustment values need to be parsed.

In another possible embodiment, if the M adjustment values may be one adjustment value, two adjustment values, . . . , K adjustment values, the adjustment value grouping indication information may be a variety of values.

In this case, if K pixel groups correspond to the same adjustment value, then the adjustment value grouping indication information can be the fourth value, which represents that K pixel groups correspond to the same adjustment value. On this basis, after the decoding side is informed that the adjustment value grouping indication information is the fourth value, it can be informed that the K pixel groups correspond to the same adjustment value.

If K pixel groups correspond to two adjustment values, e.g., the first pixel group and the second pixel group correspond to one adjustment value, and the third pixel group and the fourth pixel group correspond to another adjustment value, then the adjustment value grouping indication information may be the fifth value, which represents that the first pixel group and the second pixel group correspond to one adjustment value, and the third pixel group and the fourth pixel group correspond to another adjustment value. On this basis, after the decoding side is informed that the adjustment value grouping indication information is the fifth value, it is determined that the first pixel group and the second pixel group correspond to one adjustment value, and the third pixel group and the fourth pixel group correspond to another adjustment value.

If K pixel groups correspond to two adjustment values, e.g., the first pixel group and the fourth pixel group correspond to one adjustment value, and the second pixel group and the third pixel group correspond to another adjustment value, then the adjustment value grouping indication information may be a third value. On this basis, after the decoding side is informed that the adjustment value grouping indication information is the third value, it is determined that the first pixel group and the fourth pixel group correspond to one adjustment value, and the second pixel group and the third pixel group correspond to another adjustment value.

By analogy, each value of the adjustment value grouping indication information corresponds to a mapping relationship, which can represent the matching relationship between M adjustment values and K pixel groups. The corresponding relationship between the values of the adjustment value grouping indication information and the mapping relationship can be agreed at the coding side and the decoding side, and there is no restriction on this.

To sum up, the adjustment value grouping indication information indicates a matching relationship between M adjustment values and K pixel groups. Moreover, after the decoding side parses the adjustment value grouping indication information from the bit stream, it can parse M adjustment values from the bit stream of the current image region based on the adjustment value grouping indication information and determine the adjustment values for the K pixel groups based on the M adjustment values, i.e., determine the adjustment values for K pixel groups based on the matching relationship between the M adjustment values and the K pixel groups.

Illustratively, each of the above embodiments may be realized individually or in combination, e.g., each of the embodiments 1 to 15 can be realized separately, and at least two of the embodiments 1 to 15 can be realized in combination.

For example, in the above embodiments, the content of the coding side can also be applied to the decoding side, that is, the decoding side can process it in the same way, and the content of the decoding side can also be applied to the coding side, that is, the coding side can process it in the same way.

Embodiment 16: Based on the same application concept as the method described above, a decoding apparatus is further proposed in an embodiment of the present disclosure, which is applied to a decoding side, and the decoding side includes: a memory, configured to store video data; a decoder configured to realize the decoding methods in Embodiments 1 to 15, i.e., a processing flow at the decoding side.

For example, in a possible implementation, a decoder configured to implement:

determine, based on feature information of a current image region, whether to perform a reconstruction value adjustment on current image region;

if determine to perform the reconstruction value adjustment on the current image region, acquire an adjustment parameter for the current image region from a bit stream of the current image region; and adjust a reconstruction value of the current image region based on the adjustment parameter.

Based on the same application concept as the method described above, a coding apparatus is further proposed in an embodiment of the present disclosure, which is applied to a coding side, and the coding side includes: a memory, configured to store video data; a coder configured to realize the coding methods in Embodiments 1 to 15, i.e., a processing flow at the coding side.

For example, in a possible implementation, a coder configured to implement:

determine, based on feature information of a current image region, whether to perform a reconstruction value adjustment on current image region;

if determine to perform the reconstruction value adjustment on the current image region, acquire an adjustment parameter for the current image region, where the adjustment parameter is for adjusting a reconstruction value of the current image region; and code the adjustment parameter for the current image region into a bit stream of the current image region.

Figure 7A:
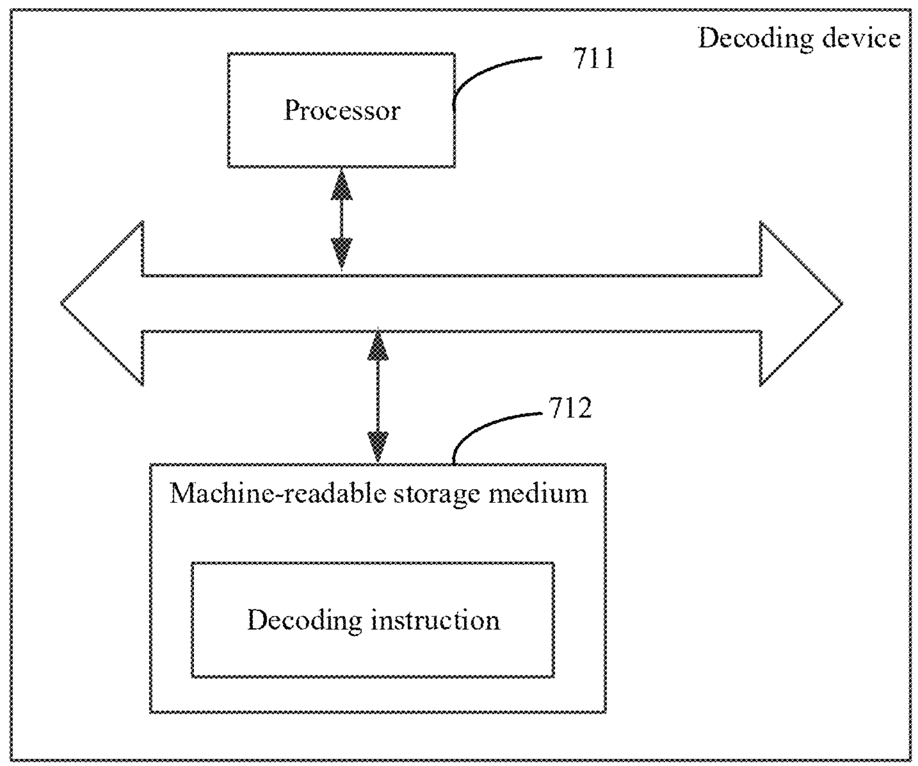
FIG. 7A is a hardware structure diagram of a decoding side device in an embodiment of the present disclosure.

Based on the same application concept as the method described above, from a hardware level, a schematic diagram of a hardware architecture of a decoding side device (which can also be named as a video decoder) provided by the embodiment of the present disclosure can be specifically shown in FIG. 7A. It includes: a processor 711 and a machine-readable storage medium 712, where the machine-readable storage medium 712 stores machine-executable instructions that can be executed by the processor 711; the processor 711 is configured to execute machine-executable instructions to realize the decoding methods in Embodiments 1 to 15 described above.

Figure 7B:
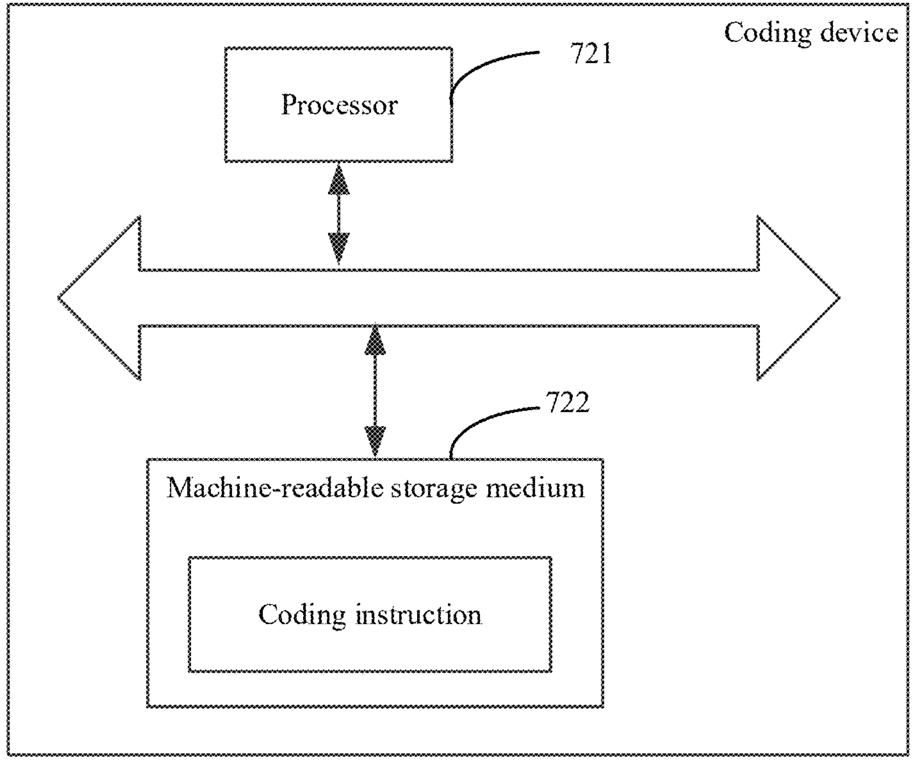
FIG. 7B is a hardware structure diagram of a coding side device in an embodiment of the present disclosure.

Based on the same application concept as the method described above, from a hardware level, a schematic diagram of a hardware architecture of a coding side device (which can also be named as a video coder) provided by the embodiment of the present disclosure can be specifically shown in FIG. 7B. It includes: a processor 721 and a machine-readable storage medium 722, where the machine-readable storage medium 722 stores machine-executable instructions that can be executed by the processor 721; the processor 721 is configured to execute machine-executable instructions to realize the coding methods in Embodiments 1 to 15 described above.

Based on a same application idea as the above methods, an embodiment of the present disclosure provides a machine-readable storage medium storing several computer instructions, where the computer instructions are executed by a processor to perform the methods disclosed in the above embodiments of the present disclosure, for example, the coding method or decoding method in the above embodiments.

Based on the same application concept as the above methods, an embodiment of the present application further provides a computer application program, which, when executed by a processor, can realize the decoding method or the coding method disclosed in the above embodiments of the present disclosure.

Based on the same application concept as the above method, a decoding apparatus is further proposed in the embodiments of the present disclosure, where the decoding apparatus is applied to a decoding side, the decoding apparatus including: a determining module, configured to: determine, based on feature information of a current image region, whether to perform a reconstruction value adjustment on the current image region; an acquiring module, configured to: if determine to perform the reconstruction value adjustment on the current image region, acquire an adjustment parameter for the current image region from a bit stream of the current image region; and an adjusting module, configured to: adjust a reconstruction value of the current image region based on the adjustment parameter.

For example, the feature information includes first feature information, the determining module, when determining, based on feature information of a current image region, whether to perform a reconstruction value adjustment on the current image region, is specifically configured to: if the first feature information of the current image region meets a first specific condition, acquire a flag bit corresponding to an adjustment control switch from the bit stream of the current image region, and determine, based on the flag bit, whether to perform the reconstruction value adjustment on the current image region; where, if the flag bit is a first value, determine to perform the reconstruction value adjustment on the current image region, and if the flag bit is the second value, determine not to perform the reconstruction value adjustment on the current image region.

For example, the determining module, when determining, based on feature information of a current image region, whether to perform a reconstruction value adjustment on the current image region, is specifically configured to: if the first feature information of the current image region does not meet the first specific condition, determine not to perform the reconstruction value adjustment on the current image region.

For example, the feature information includes second feature information, the determining module, when determining, based on feature information of a current image region, whether to perform a reconstruction value adjustment on the current image region, is specifically configured to: if the second feature information of the current image region meets a second specific condition, determine to perform the reconstruction value adjustment on the current image region, and if the second feature information of the current image region does not meet the second specific condition, determine not to perform the reconstruction value adjustment on the current image region.

For example, the adjustment parameter for the current image region includes a plurality of adjustment values, the current image region corresponding to a plurality of pixel groups, the plurality of adjustment values include adjustment values for K pixel groups which are part of or all the plurality of pixel groups; the adjusting module, when adjusting a reconstruction value of the current image region based on the adjustment parameter, is specifically configured to: for each pixel group in the K pixel groups, if the plurality of adjustment values include an adjustment value for the pixel group, adjust the reconstruction value of pixel points in the pixel group based on the adjustment value for the pixel group.

For example, the acquiring module is further configured to acquire adjustment value grouping indication information from the bit stream of the current image region, the adjustment value grouping indication information indicates a mapping relationship between adjustment values and the K pixel groups; parse M adjustment values from the bit stream of the current image region based on the adjustment value grouping indication information, where the Mis a positive integer and the M is less than or equal to K; and determine the adjustment values for the K pixel groups based on the M adjustment values.

For example, the determining module is further configured to determine the current image region corresponding to a plurality of pixel groups in a determining manner: determining the plurality of pixel groups corresponding to the current image region according to pre-adjustment reconstruction values of each pixel point; or, a classification value of a pixel point is determined based on the pre-adjustment reconstruction values of surrounding pixels of the pixel point, and the plurality of pixel groups corresponding to the current image region are determined according to classification values of each pixel point; or, determining the plurality of pixel groups corresponding to the current image region according to a pixel position of each pixel point; or, determining the plurality of pixel groups corresponding to the current image region according to a prediction mode of the current image region; or, determining the plurality of pixel groups corresponding to the current image region according to a scanning order of the current image region.

For example, the determining module, when determining the plurality of pixel groups corresponding to the current image region according to a prediction mode of the current image region, is specifically configured to: determine a number of partitions, a filtering region, and a partition manner for partitioning pixel groups according to the prediction mode of the current image region; and determine the plurality of pixel groups corresponding to the current image region based on the number of partitions, the filtering region and the partition manner. The determining module, when determining the plurality of pixel groups corresponding to the current image region based on the number of partitions, the filtering region and the partition manner, is specifically configured to: if the prediction mode of the current image region is a horizontal prediction mode, determine that the number of partitions of the pixel group is a first number of partitions, the filtering region of the pixel group is a first filtering region, and the partition manner is a first size specification; and if the prediction mode of the current image region is a non-horizontal prediction mode, determine that the number of partitions of the pixel group is a second number of partitions, the filtering region of the pixel group is a second filtering region, and the partition manner is a second size specification.

Based on the same application concept as the above method, a coding apparatus is further proposed in the embodiments of the present disclosure, where the coding apparatus is applied to a coding side, the coding apparatus including: a determining module, configured to: determine, based on feature information of a current image region, whether to perform a reconstruction value adjustment on the current image region; an acquiring module, configured to: if determine to perform the reconstruction value adjustment on the current image region, acquire an adjustment parameter for the current image region, where the adjustment parameter is for adjusting a reconstruction value of the current image region; and a coding module, configured to code the adjustment parameter for the current image region into a bit stream of the current image region.

For example, the feature information includes first feature information, the determining module, when determining, based on feature information of a current image region, whether to perform a reconstruction value adjustment on the current image region, is specifically configured to: if the first feature information of the current image region meets a first specific condition, determine whether to perform the reconstruction value adjustment on the current image region, and code a flag bit corresponding to an adjustment control switch in the bit stream of the current image region, where the flag bit indicates whether to perform the reconstruction value adjustment on the current image region; and if the first feature information of the current image region does not meet the first specific condition, determine not to perform the reconstruction value adjustment on the current image region.

For example, the current image region corresponding to a plurality of pixel groups, the adjustment parameter for the current image region includes a plurality of adjustment values, the plurality of adjustment values include adjustment values for K pixel groups, and the K pixel groups are part of or all the plurality of pixel groups, the coding module, when coding the adjustment parameter for the current image region into a bit stream of the current image region, is specifically configured to: code M adjustment values for K pixel groups in the bit stream of the current image region, where M is a positive integer, and M is less than or equal to K, and the M adjustment values are determined based on the adjustment values for K pixel groups; the coding module is further configure to code adjustment value grouping indication information in the bit stream of the current image region, and the adjustment value grouping indication information indicates a matching relationship between the M adjustment values and the K pixel groups.

For example, the determining module is further configured to determine the current image region corresponding to a plurality of pixel groups in a following manner: determining the plurality of pixel groups corresponding to the current image region according to pre-adjustment reconstruction values of each pixel point; or, a classification value of a pixel point is determined based on the pre-adjustment reconstruction values of surrounding pixels of the pixel point, and the plurality of pixel groups corresponding to the current image region are determined according to classification values of each pixel point; or, determining the plurality of pixel groups corresponding to the current image region according to a pixel position of each pixel point; or, determining the plurality of pixel groups corresponding to the current image region according to a prediction mode of the current image region; or, determining the plurality of pixel groups corresponding to the current image region according to a scanning order of the current image region.

For example, the determining module, when determining the plurality of pixel groups corresponding to the current image region according to a prediction mode of the current image region, is specifically configured to: determine a number of partitions, a filtering region, and a partition manner for partitioning pixel groups according to the prediction mode of the current image region; and determine the plurality of pixel groups corresponding to the current image region based on the number of partitions, the filtering region and the partition manner. The determining module, when determining the plurality of pixel groups corresponding to the current image region based on the number of partitions, the filtering region and the partition manner, is specifically configured to: if the prediction mode of the current image region is a horizontal prediction mode, determine that the number of partitions of the pixel group is a first number of partitions, the filtering region of the pixel group is a first filtering region, and the partition manner is a first size specification; and if the prediction mode of the current image region is a non-horizontal prediction mode, determine that the number of partitions of the pixel group is a second number of partitions, the filtering region of the pixel group is a second filtering region, and the partition manner is a second size specification.

It should be understood by those skilled in the art that embodiments of the present disclosure can be provided as a method, a system, or a computer program product. The present disclosure can take the form of an entirely hardware embodiment, an entirely software embodiment, or an embodiment combining software and hardware aspects. Embodiments of the present disclosure can take the form of a computer program product implemented on one or more computer-usable storage media (including but not limited to disk storage, CD-ROM, optical storage, etc.) containing computer-usable program codes.

The above is only embodiments of the present disclosure and is not intended to limit the present disclosure. Various modifications and variations of the present disclosure will occur to those skilled in the art. Any modifications, equivalent substitutions, improvements, etc. made within the spirit and principle of the present disclosure should be included in the scope of the claims of the present disclosure.

The invention claimed is:

1. An image decoding method, performed by a decoding device, the image decoding method comprising:
determining, based on feature information of a current image region, whether performing a reconstruction value adjustment on the current image region is allowed, wherein the feature information of the current image region comprises a prediction mode, and when the prediction mode is a normal intra prediction mode, determining that performing the reconstruction value adjustment on the current image region is allowed;
in response to determining to perform the reconstruction value adjustment on the current image region, acquiring an adjustment parameter for the current image region from a bit stream of the current image region; and
adjusting a reconstruction value of the current image region based on the adjustment parameter.

2. The method according to claim 1, wherein the adjustment parameter for the current image region comprises a plurality of adjustment values, the current image region corresponds to a plurality of pixel groups, the plurality of adjustment values comprise adjustment values for K pixel groups which are part of or all the plurality of pixel groups;
wherein the adjusting a reconstruction value of the current image region based on the adjustment parameter comprises:
for each pixel group in the K pixel groups, if the plurality of adjustment values comprise an adjustment value for the pixel group, adjusting the reconstruction value of pixel points in the pixel group based on the adjustment value for the pixel group,
wherein K is an integer greater than or equal to 1.

3. The method according to claim 2, wherein if the K pixel groups are part of the plurality of pixel groups, the method further comprises:
acquiring pixel group indication information corresponding to the K pixel groups from the bit stream of the current image region; and
selecting the K pixel groups from all of the pixel groups based on the pixel group indication information;
wherein the pixel group indication information distinguishes pixel groups of a target category among pixel groups of all categories.

4. The method according to claim 2, wherein the current image region corresponding to a plurality of pixel groups comprises:
determining the plurality of pixel groups corresponding to the current image region according to pixel positions of respective pixel points in the current image region; or,
determining the plurality of pixel groups corresponding to the current image region according to a prediction mode of the current image region.

5. The method according to claim 4, wherein the determining the plurality of pixel groups corresponding to the current image region according to a prediction mode of the current image region comprises:
determining, based on the prediction mode of the current image region, a number of partitions, a filtering region, and a partition manner for partitioning pixel groups; and
determining the plurality of pixel groups corresponding to the current image region based on the number of partitions, the filtering region and the partition manner.

6. The method according to claim 5, wherein if the current image region is a 16*2 image block, the determining, based on the prediction mode of the current image region, a number of partitions, a filtering region, and a partition manner for partitioning pixel groups comprises:
if the prediction mode of the current image region is a horizontal prediction mode, determining that the number of partitions of the pixel group is a first number of partitions, the filtering region of the pixel group is a first filtering region, and the partition manner is a first size specification, wherein the first number of partitions is 4, and the first size specification is 8*1.

7. The method according to claim 5, wherein if the current image region is a 16*2 image block, the determining, based on the prediction mode of the current image region, a number of partitions, a filtering region, and a partition manner for partitioning pixel groups comprises:
if the prediction mode of the current image region is a non-horizontal prediction mode, determining that the number of partitions of the pixel group is a second number of partitions, the filtering region of the pixel group is a second filtering region, and the partition manner is a second size specification, wherein the second number of partitions is 4, and the second size specification is 4*2.

8. A non-transitory machine-readable storage medium, wherein computer instructions are stored on the machine-readable storage medium, and when executed by at least one processor, the method according to claim 1 is implemented.

9. An image coding method, performed by a coding device, the image coding method comprising:
determining, based on feature information of a current image region, whether performing a reconstruction value adjustment on the current image region is allowed, wherein the feature information of the current image region comprises a prediction mode, and when the prediction mode is a normal intra prediction mode, determining that performing the reconstruction value adjustment on the current image region is allowed;
in response to determining to perform the reconstruction value adjustment on the current image region, acquiring an adjustment parameter for the current image region, wherein the adjustment parameter is for adjusting a reconstruction value of the current image region; and
coding the adjustment parameter for the current image region into a bit stream of the current image region.

10. The method according to claim 9, wherein the current image region corresponds to a plurality of pixel groups, the adjustment parameter for the current image region comprises a plurality of adjustment values, the plurality of adjustment values comprise adjustment values for K pixel groups which are part of or all the plurality of pixel groups.

11. The method according to claim 10, wherein the current image region corresponding to a plurality of pixel groups comprises:
determining the plurality of pixel groups corresponding to the current image region according to pixel positions of respective pixel points in the current image region; or,
determining the plurality of pixel groups corresponding to the current image region according to a prediction mode of the current image region.

12. The method according to claim 11, wherein the determining the plurality of pixel groups corresponding to the current image region according to a prediction mode of the current image region comprises:

determining, based on the prediction mode of the current image region, a number of partitions, a filtering region, and a partition manner for partitioning pixel groups; and determining the plurality of pixel groups corresponding to the current image region based on the number of partitions, the filtering region and the partition manner.

13. The method according to claim 12, wherein if the current image region is a 16*2 image block, the determining, based on the prediction mode of the current image region, a number of partitions, a filtering region, and a partition manner for partitioning pixel groups comprises:

if the prediction mode of the current image region is a horizontal prediction mode, determining that the number of partitions of the pixel group is a first number of partitions, the filtering region of the pixel group is a first filtering region, and the partition manner is a first size specification, wherein the first number of partitions is 4, and the first size specification is 8*1.

14. The method according to claim 12, wherein if the current image region is a 16*2 image block, the determining, based on the prediction mode of the current image region, a number of partitions, a filtering region, and a partition manner for partitioning pixel groups comprises:

if the prediction mode of the current image region is a non-horizontal prediction mode, determining that the number of partitions of the pixel group is a second number of partitions, the filtering region of the pixel group is a second filtering region, and the partition manner is a second size specification, wherein the second number of partitions is 4, and the second size specification is 4*2.

15. An image coding device, comprising at least one processor and a machine-readable storage medium, wherein the machine-readable storage medium stores machine-executable instructions executable by the at least one processor, and the at least one processor is configured to execute the machine-executable instructions to implement the method according to claim 9.

16. A non-transitory machine-readable storage medium, wherein computer instructions are stored on the machine-readable storage medium, and when executed by at least one processor, the method according to claim 9 is implemented.

17. An image decoding device, comprising at least one processor and a machine-readable storage medium, wherein the machine-readable storage medium stores machine-executable instructions executable by the at least one processor, and the at least one processor is configured to execute the machine-executable instructions to perform operations comprising:

determining, based on feature information of a current image region, whether performing a reconstruction value adjustment on the current image region is allowed, wherein the feature information of the current image region comprises a prediction mode, and when the prediction mode is a normal intra prediction mode, determining that performing the reconstruction value adjustment on the current image region is allowed;

in response to determining to perform the reconstruction value adjustment on the current image region, acquiring an adjustment parameter for the current image region from a bit stream of the current image region; and adjusting a reconstruction value of the current image region based on the adjustment parameter.

18. The image decoding device according to claim 17, wherein the adjustment parameter for the current image region comprises a plurality of adjustment values, the current image region corresponds to a plurality of pixel groups, the plurality of adjustment values comprise adjustment values for K pixel groups which are part of or all the plurality of pixel groups;

wherein the at least one processor, when adjusting the reconstruction value of the current image region based on the adjustment parameter, is further configured to:

for each pixel group in the K pixel groups, if the plurality of adjustment values comprise an adjustment value for the pixel group, adjust the reconstruction value of pixel points in the pixel group based on the adjustment value for the pixel group, wherein K is an integer greater than or equal to 1.

19. The image decoding device according to claim 18, wherein if the K pixel groups are part of the plurality of pixel groups, the at least one processor is further configured to:

acquire pixel group indication information corresponding to the K pixel groups from the bit stream of the current image region; and select the K pixel groups from all of the pixel groups based on the pixel group indication information;

wherein the pixel group indication information distinguishes pixel groups of a target category among pixel groups of all categories.

20. The image decoding device according to claim 18, wherein the at least one processor, when determining the current image region corresponding to the plurality of pixel groups, is further configured to:

determine the plurality of pixel groups corresponding to the current image region according to pixel positions of respective pixel points in the current image region; or, determine the plurality of pixel groups corresponding to the current image region according to a prediction mode of the current image region.

* * * * *